US008860548B2

(12) United States Patent
Devecka

(10) Patent No.: US 8,860,548 B2
(45) Date of Patent: Oct. 14, 2014

(54) METHODS AND APPARATUS FOR ART SUPPLY USEAGE COMPLIANCE

(75) Inventor: John R. Devecka, Clabasas, CA (US)

(73) Assignee: Devecka Enterprises, Inc., Chester, NJ (US)

( * ) Notice: Subject to any disclaimer, the term of this patent is extended or adjusted under 35 U.S.C. 154(b) by 1188 days.

(21) Appl. No.: 12/751,038

(22) Filed: Mar. 31, 2010

(65) Prior Publication Data

US 2010/0253468 A1 Oct. 7, 2010

Related U.S. Application Data

(60) Provisional application No. 61/166,017, filed on Apr. 2, 2009.

(51) Int. Cl.

*G05B 23/02* (2006.01)
*B43L 25/00* (2006.01)

(Continued)

(52) U.S. Cl.

CPC ................ *A63H 33/22* (2013.01); *B43L 25/00* (2013.01); *B43K 23/016* (2013.01); *B43K 23/008* (2013.01); *B43M 11/06* (2013.01); *B43K 24/02* (2013.01); *B43K 23/00* (2013.01); *B43K 8/24* (2013.01); *B43L 23/00* (2013.01); *B43K 8/006* (2013.01); *B43K 23/001* (2013.01); *B43K 24/00* (2013.01); *B43K 29/08* (2013.01); *B43L 3/005* (2013.01); *B43K 29/00* (2013.01); *B43K 25/00* (2013.01); *B43L 1/00* (2013.01); *B43K 8/028* (2013.01)

USPC ...... 340/3.1; 340/686.6; 307/116; 178/19.01; 178/19.02; 382/123; 345/179; 455/41.3

(58) Field of Classification Search

USPC .............. 340/3.1, 686.6; 307/116; 178/19.01, 178/19.02; 382/123; 345/179; 455/41.3

See application file for complete search history.

(56) References Cited

U.S. PATENT DOCUMENTS 4,165,513 A * 8/1979 Flory ............................ 346/141
4,667,182 A 5/1987 Murphy (Continued)

FOREIGN PATENT DOCUMENTS

EP 0552597 A1 7/1993

OTHER PUBLICATIONS

Is there such thing as baby proof crayons; URL: http://malaysia.answers.yahoo.com/question/index?qid=20080428033054AAvcXXN.

*Primary Examiner* — Benjamin C Lee
*Assistant Examiner* — Quang D Pham
(74) *Attorney, Agent, or Firm* — Law Offices of Peter H. Priest, PLLC

(57) ABSTRACT

Techniques are addressed for providing young children with an art experience in which opportunities to misuse art supplies, such as crayons, markers and the like are substantially reduced. To such ends, an art supply system is provided in which selectively enabled art supplies are automatically enabled so that they are useable only within a compliant usage zone, such as within a predetermined distance of an acceptable work surface.

20 Claims, 25 Drawing Sheets

(51) Int. Cl.

| | |
|---|---|
| ***B43K 23/016*** | (2006.01) |
| ***B43K 23/008*** | (2006.01) |
| ***B43M 11/06*** | (2006.01) |
| ***B43K 24/02*** | (2006.01) |
| ***B43K 23/00*** | (2006.01) |
| ***A63H 33/22*** | (2006.01) |
| ***B43K 8/24*** | (2006.01) |
| ***B43L 23/00*** | (2006.01) |
| ***B43K 8/00*** | (2006.01) |
| ***B43K 24/00*** | (2006.01) |
| ***B43K 29/08*** | (2006.01) |
| ***B43L 3/00*** | (2006.01) |
| ***B43K 29/00*** | (2006.01) |
| ***B43K 25/00*** | (2006.01) |
| ***B43L 1/00*** | (2006.01) |
| ***B43K 8/02*** | (2006.01) |

(56) References Cited

U.S. PATENT DOCUMENTS

| | | | | |
|---|---|---|---|---|
| 6,536,972 | B2 | 3/2003 | Bramlett et al. | |
| 6,749,355 | B2 | 6/2004 | Payne et al. | |
| 6,830,402 | B2 | 12/2004 | Sunatori | |
| 6,846,077 | B2 * | 1/2005 | Bich et al. | 347/109 |
| 6,957,923 | B2 | 10/2005 | Lapstun et al. | |
| 7,232,271 | B2 | 6/2007 | Adams | |
| 7,280,851 | B2 * | 10/2007 | Oba et al. | 455/566 |
| 7,654,665 | B2 * | 2/2010 | Gray et al. | 347/109 |
| 7,831,933 | B2 * | 11/2010 | Marggraff et al. | 715/863 |
| 8,055,068 | B2 * | 11/2011 | Fuse et al. | 382/165 |
| 2002/0074171 | A1 * | 6/2002 | Nakano et al. | 178/18.01 |
| 2003/0118391 | A1 * | 6/2003 | Adams | 401/116 |
| 2004/0144575 | A1 * | 7/2004 | Zloter et al. | 178/19.02 |
| 2005/0058966 | A1 * | 3/2005 | Thornton | 434/85 |
| 2006/0040044 | A1 * | 2/2006 | Robens et al. | 427/8 |
| 2006/0084039 | A1 * | 4/2006 | Ryokai et al. | 434/155 |
| 2007/0013235 | A1 * | 1/2007 | Fein et al. | 307/116 |
| 2008/0066973 | A1 * | 3/2008 | Furuki | 178/19.04 |
| 2008/0166048 | A1 * | 7/2008 | Raif et al. | 382/187 |
| 2009/0245920 | A1 * | 10/2009 | Jeon | 401/109 |
| 2009/0315860 | A1 * | 12/2009 | Lee et al. | 345/179 |
| 2010/0021022 | A1 * | 1/2010 | Pittel et al. | 382/123 |
| 2011/0084225 | A1 * | 4/2011 | Hayes et al. | 251/298 |
| 2012/0093562 | A1 * | 4/2012 | Abplanalp | 401/17 |
| 2012/0182271 | A1 * | 7/2012 | Wu et al. | 345/179 |

* cited by examiner

FIG. 8A
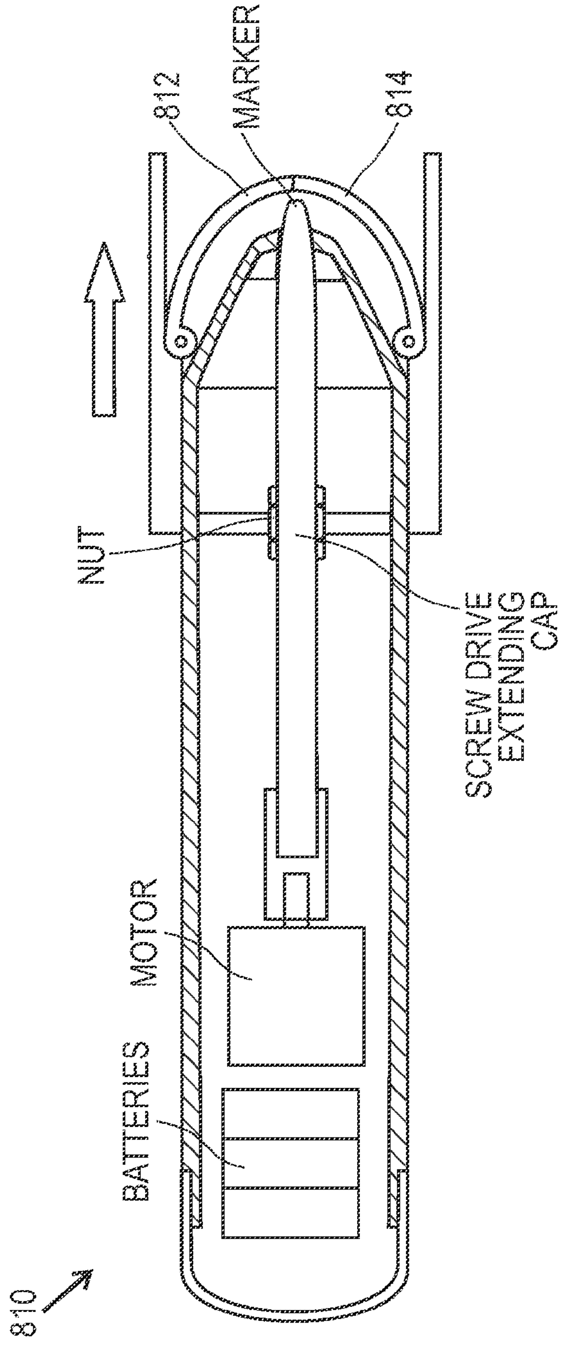
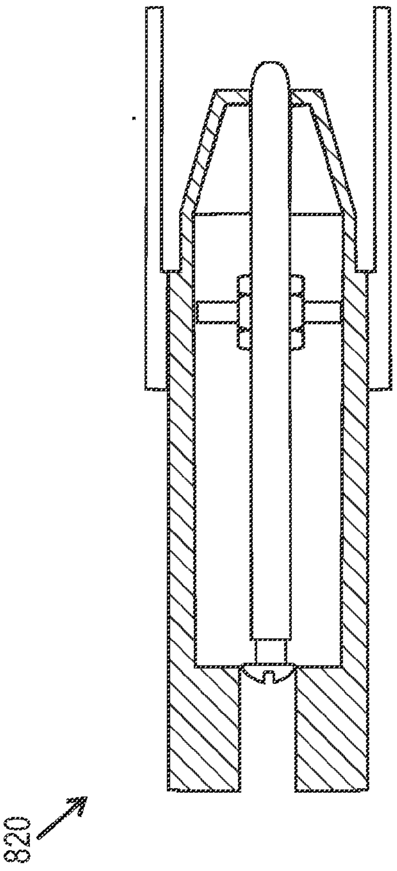
FIG. 8B

METHODS AND APPARATUS FOR ART SUPPLY USEAGE COMPLIANCE

The present application claims priority of U.S. Provisional Application Ser. No. 61/166,017 filed Apr. 2, 2009 which is incorporated by reference herein in its entirety.

FIELD OF THE INVENTION

The present invention relates generally to a child safety device which allows the potentially unsafe device to be activated or deactivated under certain proximity and positional states in order to help a novice user operate the device in a safe manner. More particularly, the present invention is related to improved art supply safety systems allowing children to use standard art supplies and art related processes in a relatively safe manner.

BACKGROUND OF THE INVENTION

Children love to express themselves artistically using a wide range of art supplies such as crayons, markers, pens, pencils, chalks, brushes, rollers, sprays, stamps, spin and drip systems, cutting devices and glues, for example, as well as various other art supplies. Such art supplies often cause concern from parents due to the potential for misuse, ingestion, injury and accidents.

Unsupervised, young children are known to take markers, crayons, paints, pens and other art implements, stray away from the acceptable writing surface, such as a child's desk, easel, or the like, and draw on other surfaces in the home. Whether intentional or not, drawing, painting, or the like on a non-approved surface, such as a wall, can be very destructive and costly to repair. A single unsupervised incident can cause thousands of dollars in damage to a home. Thus, these art supply items are often locked away or hidden until such time as a caregiver can be directly involved in supervising their use.

Since children's motor skills are not fully developed, they also accidentally color or paint outside the paper and onto a table, for example, also causing damage and mess requiring time consuming clean up. In addition, curious children sometimes put their art and writing materials in their mouths and ingest the materials or mark up their face, hands, clothes, bodies or other siblings.

Due to these and other potential misuses, caregivers typically stay within close proximity to and maintain close supervision of the child using art and writing materials to ensure these items are used properly. If they do not, they risk the consequences. It is also noted that older siblings capable of using marking implements properly must not leave these items unattended when a toddler is in the home for fear that they may take one and write on various surfaces in the house thereby causing extensive damage.

Thus, in a typical home, for example, the use of traditional art and writing materials is restricted to supervised times. Since many parents are often busy with work, caring for other children and doing chores, art and writing time is often very limited. Such time restrictions may limit the child's artistic, creative, language and motor skill development. Other, older siblings who are capable of using art supplies safely without such supervision may also be restricted in their use, since they may not return all their art supplies to a secure location when finished or may allow a younger sibling to take and utilize their art supplies in a destructive or dangerous manner.

Another problem relates to marker caps. Young children may attempt to swallow such caps. Also, children are known to have difficulty taking caps off and putting them back on. When putting a cap on a marker, children often misalign the cap and the tip and get marker on their hands. Sometimes, they put the open markers back on the writing surface which can damage it. These open markers can roll off the table and damage the floor if they fall. Children can also lose caps, put the wrong color cap on the marker or simply do not put caps back on after use. If a cap is not put on a marker, or in the case of a marker which twists open and closed, if a marker is not properly twisted closed, the marker may dry out and become unusable, resulting in the parent having to prematurely purchase more markers. Some markers offer push button or twist retraction, but they still require manual retraction and are still subject to being left open when not in use. These twist open markers can be very messy if a child grips the tip area when attempting to extend the tip, as the tip then protrudes directly into their hand or hands. Other items like pens, stamps, brushes, rollers, glues, cutting devices and other art supplies may have similar or their own unique problems.

Many children's products attempt to address safety issues. Waterbased pens, edible materials, clear inks, erasable markers, paints, pens, and electronic and non-ink based writing tablets employ a variety of techniques to attempt to deal with such problems. Unfortunately, there is no substitute for the enjoyment, feel, and developmental benefits of using real art supplies, and children love to use the same items as their older siblings and parents do.

SUMMARY OF THE INVENTION

Aspects of the present invention address such issues, as well as others, by allowing a wide variety of standard art supplies and processes to be made available to children at all times without adult supervision, greatly increasing a child's art activity time which in turn increases the overall consumption of art supplies. Thus, the system may encourage greater artistic, creative, and writing skills development, as well as safety, proper writing posture and the appropriate use of art supplies.

According to one aspect of the invention, an art supply such as a marker remains in a disabled state and is only advanced for use when it is used in a designated usage zone. In some cases, depending on the type art implement, the usage zone requires the art implement to be within a predetermined zone, proximity of, or in contact with, designated surfaces, sub surfaces, or the like, and in some cases, in a designated orientation. When the art supply is not in use, is removed from its holder, or is in a non-compliant unsafe state, the art implement is disabled and not useable. An overall compliance system in accordance with the present invention may be utilized in conjunction with a wide variety of art supplies and processes as addressed further below.

Since an overall safety system can be applied to many types of art supplies and writing implements, as well as for other toy safety compliance, specific embodiments of the invention are described to effectively operate, activate and deactivate specific groups of art implements groups based on their similar attributes.

According to one aspect of the invention, a retractable art supply system comprises an acceptable work surface and a retractable art supply mechanism for automatically advancing or uncovering an art supply tip so it can be used on the acceptable work surface when said mechanism is within a usage zone surrounding the acceptable work surface and automatically retracting the art supply file when said mechanism is outside the usage zone so it cannot be used outside the usage zone.

A more complete understanding of the present invention, as well as further features and advantages of the invention, will be apparent from the following Detailed Description and the accompanying drawings.

BRIEF DESCRIPTION OF THE DRAWINGS

FIG. 8A illustrates an alternative embodiment of a pen employing a self-sealing cap;

FIG. 8B illustrates an optional non-moving tip and extendable cover that prevents use of the tip;

DETAILED DESCRIPTION

Figure 1:
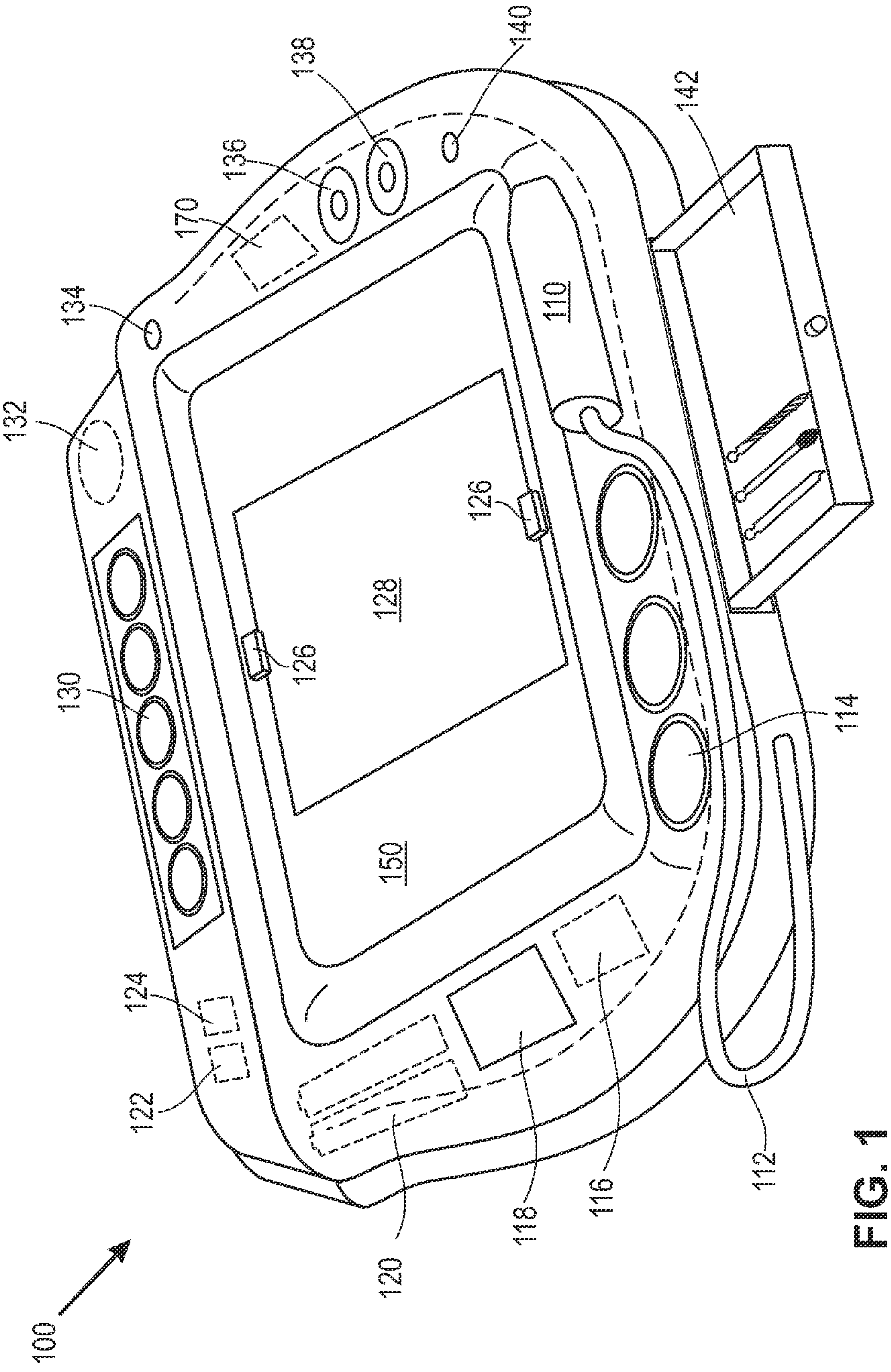
FIG. 1 illustrates an art system in accordance with a first embodiment of the present invention.

In one embodiment illustrated in FIG. 1, a system 100 in accordance with the present invention comprises a sensor or receiver located in an art supply usage compliance implement, such as a master pen or art supply holder 110, which will be described in further detail below. A low power transmitting antenna, signal or emitter may be suitable embodied on a printed circuit board (PCB) in a tablet 150. Further details of communication and sensing of holder 110 and tablet 150 are discussed below in connection with the discussion of FIG. 11A below. As illustrated in FIG. 1, system 100 additionally comprises a tether or optional power cord 112 connecting pen 110 to tablet 150. As discussed further below, pen 110 may suitably comprise a holder which may hold, and enable and disable a wide variety of art supply tips, such as crayons, colored pencils, markers, pens chalk brush tips, stamps rollers, glue sticks, glitter sticks, wand paper trimmers, air brushes, spin art supplies, or the like.

System 100 also comprises a series of containers or holders 114, a pump for an airbrush 116, a display screen 118 which may suitably be a liquid crystal touch screen display 118, batteries 120 to support battery powered operation, a radio frequency identification (RFID) sensor 122 and a wireless receiver and transmitter 124. Holders 114 can hold a wide variety of art supplies.

A clip or clips 126 are provided to hold paper 128. As discussed in greater detail below, paper 128 may suitably be standard paper or a special paper designed for use in conjunction with the system 100. In one embodiment, the clip or clips 126 may incorporate a mechanism to sense that paper 128 has been properly placed on the top surface of tablet 150 so that use of system 100 is inhibited if a suitable work surface is not being utilized.

System 100 may also suitably comprise paint or stamp pad holders 130, a speaker 132, an on and off indicator light, such as a light emitting diode (LED), a auto wash station 136, an airbrush evacuator 138, a sharpener 140 which may be a manual or an automatic sharpener as desired, a drawer 142 for holding accessories, such as additional art supply tips, and a control board for generating the RF signal and power control 170.

In operation, a signal can be driven through a transmitting antenna in transmitter 124. Alternatively, a frequency pattern or encoded signal is generated by a printed circuit board (PCB) located in of the tablet 150. It will be recognized that the PCB or other antenna might also be incorporated in a simple embodiment, such as a clipboard, eraser board, a mat, an easel, or a desk. The transmitter 124 will preferably emit an encoded signal across the entire allowable marking surface. The master holder and inserted art supply 110 remains in a disabled writing condition but begins its signal polling state. In this state, the holder searches for the compliant backing surface signal. A sensor antenna and supporting circuitry in the master holder 110 will have the ability to receive and accurately identify this unique signal and potentially its signal level. Accurate and consistent proximity detection systems will ensure that the art supply held by holder 110 is only activated near the writing surface. With the utilization of an orientation sensor means or sensors, it is further possible to disable the holder when it is not held in the correct orientation. A predetermined signal level threshold will be detectable at a predetermined distance from the tablet 150, causing activation of the holder and art supply 110 only within an acceptable play or safe usage zone.

The sensor in the master holder 110 detects the existence of a signal, preferably a unique encoded signal, which is emitted a certain distance out from the tablet 150. For example, an 8½inch by 11 inch rectangular shaped signal with a travel distance of 6 inches could suitably be employed. It could also be preferred for a parent to be able to adjust the height of the compliant zone by a control for increasing or decreasing the emitting field. It is recognized that many other proximity detecting systems can be utilized.

As other options, the compliance system could also automatically activate or have the ability to activate or potentially activate when the implement is near a compliant material on which to mark, such as a standard paper or customized paper or book. Optical, material, infrared or other sensors can be used to detect the proper marking surface, such as paper or a book. Additional compliance requirements can be added such as orientation of the implement and distance of the tip to the compliant zone or surface. In an additional approach, several of these compliance systems can be combined into one compliance system. Further, a simple magnetic surface made from material like that used for refrigerator magnets, or a ferromagnetic material in the backing can be sensed by a simple holder sensor. In another embodiment, the emitter can be located in the holder and the sensor can be in the writing surface.

Another approach utilizes a different sensor in the holder that can directly detect specific attributes of compliant marking surfaces. The paper, book, eraser board or material is then detected by the implement. The system could work with an RF or other emitting backing surface or receive all compliance information from the marking material directly. The specialized writing surface could alter the RF or other emitted signal whereby the two in combination produce a unique signal pattern signature, which is detected by the implement. In that case, standard books and paper will not activate the implement.

As a further example, a radio frequency identification (RFID) tag could be located in a book which activates the sensor in the implement or provides other information to the system. Only books having an RFID tag would then activate the implement.

In another example, the implement sensor could detect elements found in standard or customized paper and books. This implement sensor could also contain a means to scan and learn appropriate and inappropriate surfaces under a special parent activated mode. The parent could scan a coloring book or stack of paper that the child could then utilize. An indicator would tell the parent that the surface was identified. The parent could test the paper to ensure the system is working properly. In yet another example, the booklet or paper could contain unique elements mixed into or printed on the paper that are detectable by the implement sensor. The sensor could look for these attributes at certain time intervals. For example, the paper could contain a special ink, printing patterns or other elements added to the paper pulp.

Alternatively, the paper could contain a detectable customized printing pattern, infrared ink or other element. The user could be required to scan an identifier location on a book intermittently to ensure the proper books and surfaces are utilized.

Alternatively, an RFID tag or other unique identifier could also be located in a book, art tablet or other art supply material, and an RFID reader may be incorporated into the tablet 150 or pen 110. The RFID reader would recognize the material with the RFID tag as being safe to draw on. The control system can communicate and verify tasks specific to that book and writing tablet.

The tablet 150 could contain a holder for the master pen or holder 110. In this instance, the master holder and writing tablet could be controlled to turn off when placed in the holder and become powered when it is removed from the holder utilizing a sensor contained in the holder or pen to detect removal. The tablet may also suitably contain other organizers and holders, such as a slide out drawer 142 providing storage for the different types of colored art supplies. The tablet 150 can also contain a hinge and latch such that books and other items can be stored internally. The tablet may contain a wireless transmitter and receiver for communication with the master pen. Alternately, the master holder can be hard wired to the tablet 150 for security and communication.

The system 100 can contain a speaker, control board, memory, game card slot, USB port or other communication port, a scanner to save and send images, an LCD, or other display screen or touch screen and volume controls. This system can provide instructions, interactive games involving drawing, reading or point touch learning. The master pen 110 could also contain additional sensors and emitters so the safety system can also be utilized for interactive learning. For example, during a touch point game, the pen could remain retracted and a magnet in the tip would actuate responses from the backing tablet or a different slave pen can be inserted for touch activation. The backing tablet could contain additional compliant zones for paint dip stations, stamp pads, automatic or manual wash stations, air brush evacuation and test spraying, or auto or manual sharpening. In some cases an additional separate compliant zone may be preferred. For example, an air brush system may have a secondary test spray and evacuation tablet with its own capacitive emitter PCB or other emitter. The backing surface could contain a master pen holder and sensor or switch system whereby the pen's RF, inductive or other sensors activate when the pen is removed from the holder.

For a spray or pump system, the tablet 150 houses holders for the liquid or powder containers to be sprayed or pumped. The manual or mechanical pump could be located within the tablet, in the master spray pen, or it can be freestanding. The tablet may also contain a receptacle in a compliant zone for evacuating a previous color. For a consumable implement, a manual or automatic sharpener can be provided on the pen tip or it can be built into the housing of the tablet located in a compliant zone or provide sharpening compliance by another means. The work surface can be in many forms such a larger wall mounted housing allowing for multiple simultaneous users.

Another work surface is a roll up mat system that contains a flexible signal generating system or other means and an optional control housing. The mat system could utilize a flexible PCB, an alternate antenna system, or an infrared LED sensing system. The emitter could have a directed signal across the approved writing surface or directed out of the writing surface. The mat may also contain an expandable rim to provide a writing barrier in the event the child moves the implement off the mat faster than the system can be deactivated. A roll up system must easily open and fold away. Many effective materials can be used for a writing barrier, such as expandable and compressible foam, inflatable tubing, or the like. The soft and flexible rim could also be simple padding. A roll up mat can contain many of the features discussed above in connection with tablet 150 and system 100.

A pen holder in a work surface with sensor such as a magnetic reed switch, inductive sensor, electromechanical switch or other sensor system can be utilized. When the pen is removed from the holder, the switch activates in the pen to begin looking for the work surface signal. A timer could be utilized to deactivate the holder and art supply and backing surface emitter if it does not see compliant inputs in a certain amount of time. A display, LEDs, audio, vibration or other indicators can be utilized to communicate the current state of the implement. When a master pen is put back in its holder, turned off or is otherwise put down, sensors may be employed so that the tips will automatically retract, and in some cases a self-sealing cover will be closed to prevent drying of the tips. Thus, unlike standard markers, the pens according to this aspect of the invention may be automatically covered and sealed when not in use. Slave pens can be spring driven or use other means to retract when removed from the master pen.

In one embodiment, the child would place a standard book or piece of paper on a work surface such as tablet 150. The child would pick up the master holder 110 turning the power on to the master holder and the backing surface. The art supply could be built into the pen 110, or the child could attach a selected colored marker tip to be inserted in a holder. In either case, the marker tip would be retracted or covered by a closed cover and not useable. As the child moves the master holder 110 within a predetermined distance of the tablet 150, the antenna or other sensor in the master holder detects the signal at a certain acceptable threshold, the motor control board commands a motor to turn or a piston to advance the marker tip to a certain distance. The master holder's sensor system could be unidirectional or multidirectional. If unidirectional sensors are utilized, the implement may also be required to be in an appropriate orientation. For example, the implement's tip must be directed at and a certain distance from the tablet 150 thus providing an additional level of safety. In addition to RF sensors and transmitters there are many effective and known proximity and orientation sensing technologies and enabling and disabling methods that can be utilized for this invention.

The motor shaft or piston indexes the tip of the marker out and the child has the ability to color. When the child decides to change a color, the child moves the master holder outside of the compliant zone. The master holder then does not detect the signal and the motor control board commands the motor in the inverse operation described above, which retracts the tip of the marker and potentially allows release of the marker tip. Alternately, rather than the tip moving in and out of a housing, the housing or other blocking means could move in and out which would enable and disable the marker. As an alternative means of changing tips, a child could press the tip into a holder which releases it. The child could then press the master holder into another tip which would lock it in.

In a consumable tip system such as a crayon, to ensure there is an ample exposed tip, the consumable tip master holder control system will monitor tip length and appropriately control the tip length by further advancing the art supply as needed. A simple sensor in the tip of either the master holder or the slave holder that houses the core tip, would detect contact with the writing surface or near contact with the writing surface. One approach is to employ a spring switch mechanism. When the tip is worn to the switch in the ring tip of the master pen, the activated switch will send a signal to the motor control board. The control board then activates the motor to index the tip a predetermined distance. The control board could also have a timer to not activate the motor again for a predetermined time, such as 30 seconds. Alternately, a button could be provided to index the tip manually, when in a compliant state. A timer limit could also be employed to prevent over extending the tip. Lastly, it would be preferable to have a second switch or sensor located within the inner tip ring area which is activated when the core is fully retracted to prevent over retraction and confirm full retraction. Some examples of consumable tips could be crayons, chalks, colored and standard pencils, glitter sticks, glue sticks, and pencil leads.

The additional sensor, in this case a spring loaded tip with a switch, sensor or other means will index the worn tip a certain distance when pressed or when the tip is determined to be worn. This condition will occur when the tip wears down to the other ring tip. When the outer ring tip switch is depressed, the motor will drive the tip out a certain predetermined distance. A third sensing system could be utilized to determine if the wear tip was fully retracted or extended or how far a tip was extended. For example, a switch or optical sensor could also be employed in the ring. This sensor would provide information to the control system as it detects when the tip or how much of the tip passes a point in the ring tip, assisting the motor control in accurately retracting and protruding the tip.

A child wishing to use a piston tip wand based and vibration type cutters and carvers, etchers, embossing tools herein called moving tips could employ a unit having an additional compliance control system to ensure further safety.

A child selects a master holder and wand cutter tip, such as a vibration carving tip. In some embodiments the master holder and cutting and carving tips could be combined together or be specialized. The child could pick up the master holder, the cutter tip or other tips would remain retracted in a noncompliant state if they are sharp or potentially harmful. The child would move the wand cutter and place the tip near or on top of the paper that he or she wished to trim. The master wand would sense the working surface's signal and would transmit a signal that would require the master wand to be a certain distance, such as touching or less than 1 inch from its surface to be compliant. The motor control could automatically turn on the power to the wand when compliant and turn off the wand when not complaint or the motor control could allow the user to only turn on the master wand when compliant state. The child could cut out their desired shape, and when the master wand was moved further than 1 inch from the backing surface, the power is automatically turned off and the tip is retracted. A sensor or switch in the tip as described in the consumable tip example may be utilized to ensure the tip is properly retracted.

In a further example, a child wishes to use an airbrush system. The air brush system has the same backing tablet as described above utilizing commonly known spray and pump mechanisms which can be a manual or automatic pressurization systems located in the pen, backing surface or independently. In another embodiment a container could be pre-pressurized, so no other pressurization is necessary. A power source would be required to operate an automatic pump or sprayer and or a control valve to stop the flow of material based on compliance. The spray pen would have a proximity sensor and possibly a directional sensor to make sure that the spray implement can only become active when within a certain distance and when appropriately pointed at the work surface or compliant paper. The required activation distance could also reduce misting, since the system will not activate far from the backing tablet. In an active compliant state, the spray button will function when pressed. The spray tip pattern and intensity could be altered by adjusting the nozzle. In addition, different tips can be exchanged.

In the case of an internally fed roller, brush or stamp system that utilizes a liquid feed, the pump becomes active only when the master pen is in the proper zone and orientation. The user can press the pump button or manually squeeze to increase the flow of material to the roller or stamp. In that case a control valve could be used to allow the flow of material. The pump button could inject a predetermined amount and not allow additional pumps for a certain length of time while in the compliant zone, reducing the chance of over filling the tip. The roller, brush or stamp system will also have a retracting and extending system for compliant and non compliant states.

If these art supplies are externally fed or passively internally fed, the slave holder will function like other non-wear tips.

The automatic fill system for the slave roller, brush and stamps could include a tube connection means to receive fluid from the master pen or pump. Various slave rollers, tips and stamp colors and patterns can be utilized. In some cases, these slave tips, rollers and stamps could also be removed and washed. A special tool or parent override control may be provided to expose the retracted tips for washing only when a parent is available to actively supervise.

As a further example, if a child wants to utilize a spin art system, the work surface is identical to above, but additionally contains a standard rotating plate. The master holder preferably has a motor or solenoid which controls a flow value or the flow of the liquid paint or other substance that is squeeze or pumped onto the spinning paper or standard master holder with a slave tip could extend onto the spinning paper. Power to the pump could also be turned off when the holder is an acceptable release zone.

For a coloring book embodiment, an RFID chip in the book would communicate information to the implement and/or backing tablet. An external memory card may contain data and commands for optional games relating to the book. The child would pick up the pen from the holder which would activate a polling system. The power on light would turn on the pen followed by an auditory instruction to begin drawing.

An inserted colored marker could have a unique identifier switch activation arrangement which would provide the pen with information regarding color and type of marking material for use by the control system. This information could instruct the control system how to actuate the motor drive for the slave pen. For example, a non-wear tip will retract and protrude a specific consistent distance. However, a wear tip, such as a crayon or glue stick may utilize an additional system for detecting wear and maintaining ample tip length.

The backing surface tablet transmits an RF signal, and the RF sensor in the pen polls for a unique frequency or encoded signal. When the implement is within a certain number of inches from the tablet, it will receive a valid signal, and the writing implement will become activated and ready to mark. An indicator may display that the implement has been activated. A vibration may be timed with the protrusion of the tip. For example, a green light will turn on and the red tip of the marker will become exposed in a twisting or non-twisting motion, 4 inches from the paper. The child can mark the paper. When the child retracts the implement to a non complaint distance with their hand, the tip becomes inactive, a vibration pulse is activated, a voice may indicate “pen retracted”, the indicator light turns red and the tip becomes non-exposed and fully covered to protect the tip from drying out. If the child slams a pen with a certain amount of force or repeated force on a surface, warning indicators can be initiated to discontinue this action. If this misuse is repeated, a pen can be temporarily disabled or retracted. A child could have several different master pen holders for different slave art supply sets utilizing one backing surface.

In the case of a zone sensing system, larger and less discrete areas, such as an entire standard table top or a room, such as a playroom, could be a compliant area. In this case, the transmitter could be directed infrared emissions covering the table or room and the implement sensor could be an infrared sensor or other zone sensors and emitters.

Figure 2:
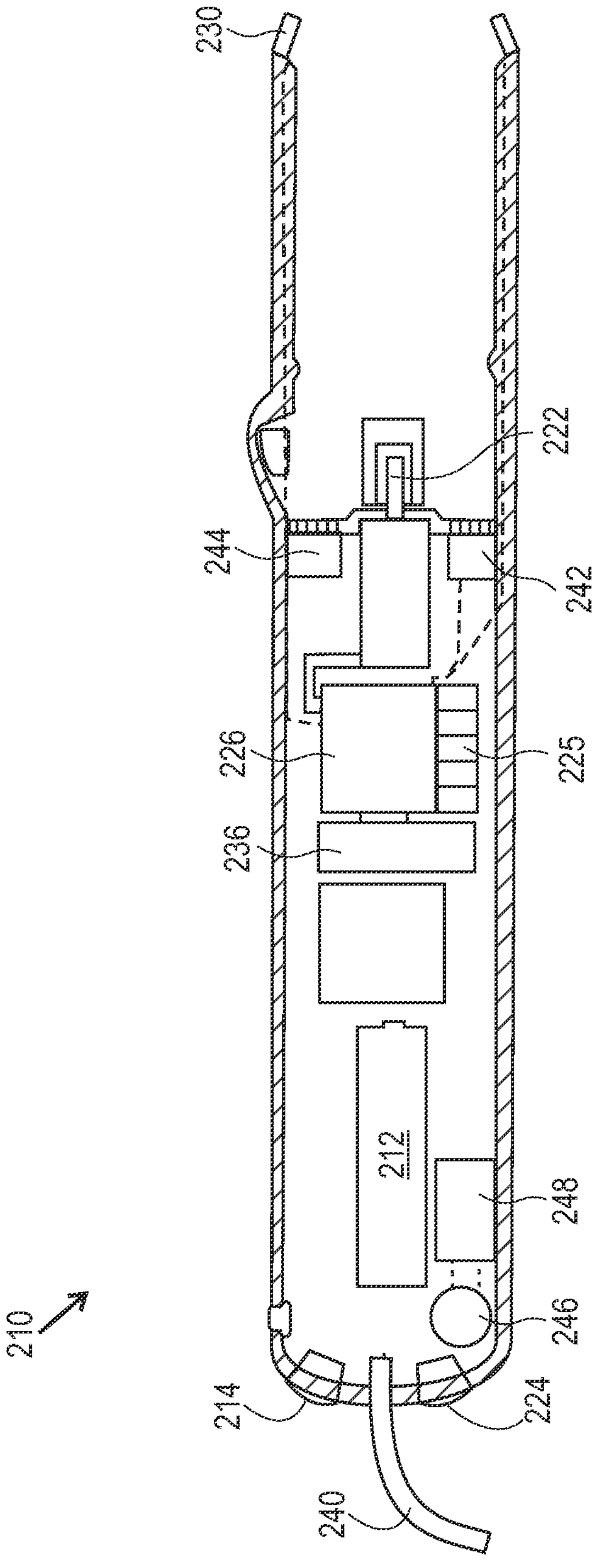
FIG. 2 illustrates a first art supply holder suitable for use in the system of FIG. 1.

FIG. 2 shows further details of one embodiment of a holder 210 which in conjunction with one or more suitable tips is suitable for use as the pen 110 in FIG. 1. Utilizing a combination of proximity or material sensing means as described above, the holder 210 comprises electronics to control a mechanical holding and advancement system. Suitable disabled tips or inserts which are replaceable are interlocked into the holder 210 as discussed further below.

Holder 210 may suitably contain the following components: a power source, such as battery 212, or a connection to power by a cable 213 or the like, an on and off power switch 214, an index control button 224 to control advancement of the art supply being used, such as a crayon. A proximity sensor can be utilized to poll for the signal emitted by transmitter 124 of the tablet 150 or the system can be reversed. The holder 210 can become activated to look for the tablet signal via a motion sensor, or a capacitive sensor which senses the specific change of capacitive attributes when a human hand holds the holder 210. A second capacitive or other form of touch sensor can be located in a specific area such as in the standard grip area of a pen, for example, to ensure that proper grip position is also utilized and required to active the pen.

In holder 210, a motor 220 with a rotating shaft 222 for connecting to and for indexing a consumable marker is controlled by motor control logic 226. The holder 210 may also suitably comprise a means for sensing marker wear, such as a spring loaded index tip switch 230. The indexing button 224 may be utilized to limit manual indexing when the holder is sensed to be adequately proximate to a work surface, such as tablet 150. An associated timer which may be utilized to limit manual indexing and prevent over extension. For example, when button 224 is pressed, the holder 210 will advance the marker a predetermined length, and will not extend marker material any further for a predetermined amount of time thereafter. Internal or external directional or multi-directional RF or other proximity or material sensors may be employed to insure the holder is being appropriately employed proximate to the tablet 150. The control board 226 may employ a microcontroller, sensing, motor control logic and motor driver electronics as discussed further below.

Holder 210 may also suitably comprise a wireless communication system employing a wireless receiver and transmitter 236 with supporting logic for communication with the tablet 150. Alternatively, a wired connection 240 to the backing surface may be employed. Optional switches or sensors 242 and 244 for determining the color and type of the art supply insert, an optional speaker 246, an LCD or other display 248, a timer, a marker type switch or sensor that drives the motor algorithm for either consumable or non-consumable markers, and an opening and connection means to receive the slave marker or optional snap fit side mounting means may also be provided. A switch, sensor, spring loaded door sensor or wheel can be utilized to determine that a consumable marker has been retracted sufficiently. Additionally, a sensor system may be suitably employed to determine that the art supply is being held by the holder 210.

As discussed in connection with FIG. 1, the holder 210 may be tethered to a base or backing board by a tether, such as connection 240. The tether may suitably include wires that provide power from the base unit to the holder 210 and which are utilized for communication signals to or from the tablet 150. In this case, the microcontroller in the tablet 150 may do some or all of the information processing required by the implement.

Figure 3:
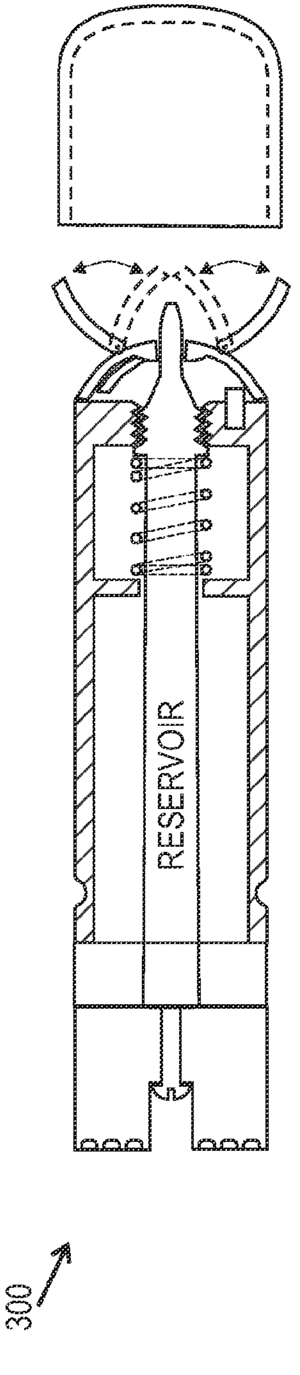
FIG. 3 illustrates a slave tip for holding an art supply such as a marker, and for insertion in a holder suitable for use in the system of FIG. 1.
Figure 4:
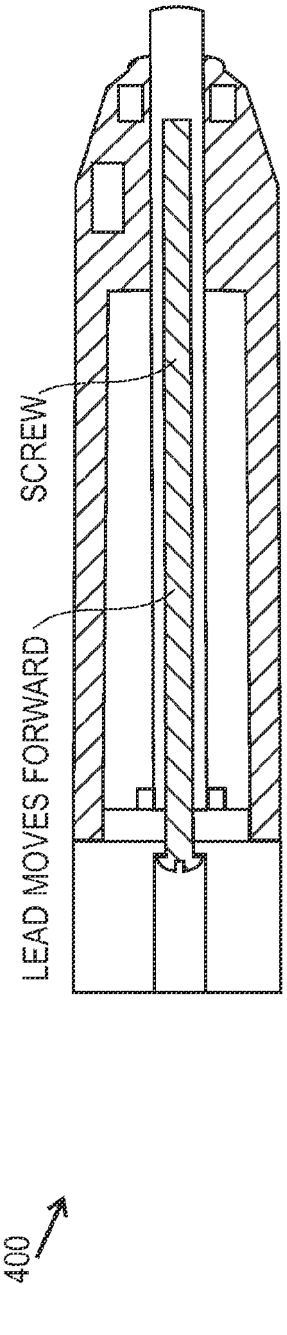
FIG. 4 illustrates a slave tip holder for holding an art supply such as colored pencil lead, and for insertion in a holder and suitable for use in the system of FIG. 1.
Figure 5:
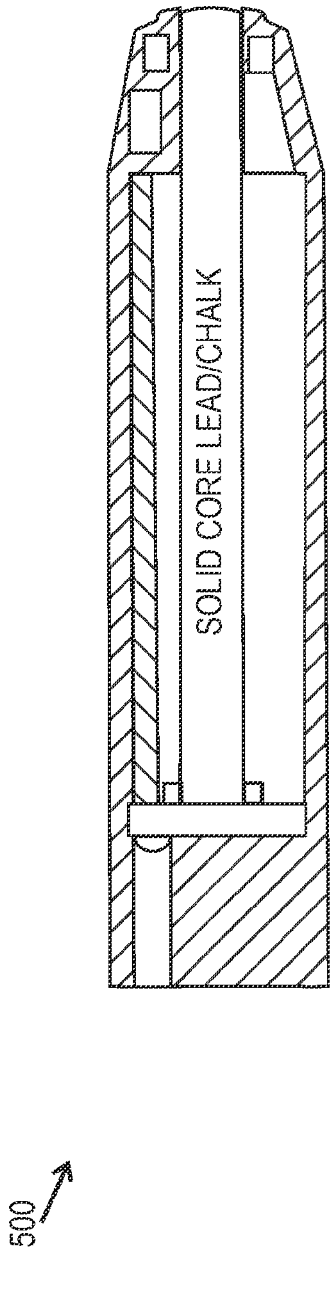
FIG. 5 illustrates a holder suitable for use in the system like that of FIG. 1.

FIGS. 3-5 illustrate some exemplary inserts or tips 300, 400 and 500 for use with the holder 210 of FIG. 2. These inserts can contain a protected drive means such as a recessed screw or the like to prevent extension of the tip when not in use.

Figure 6:
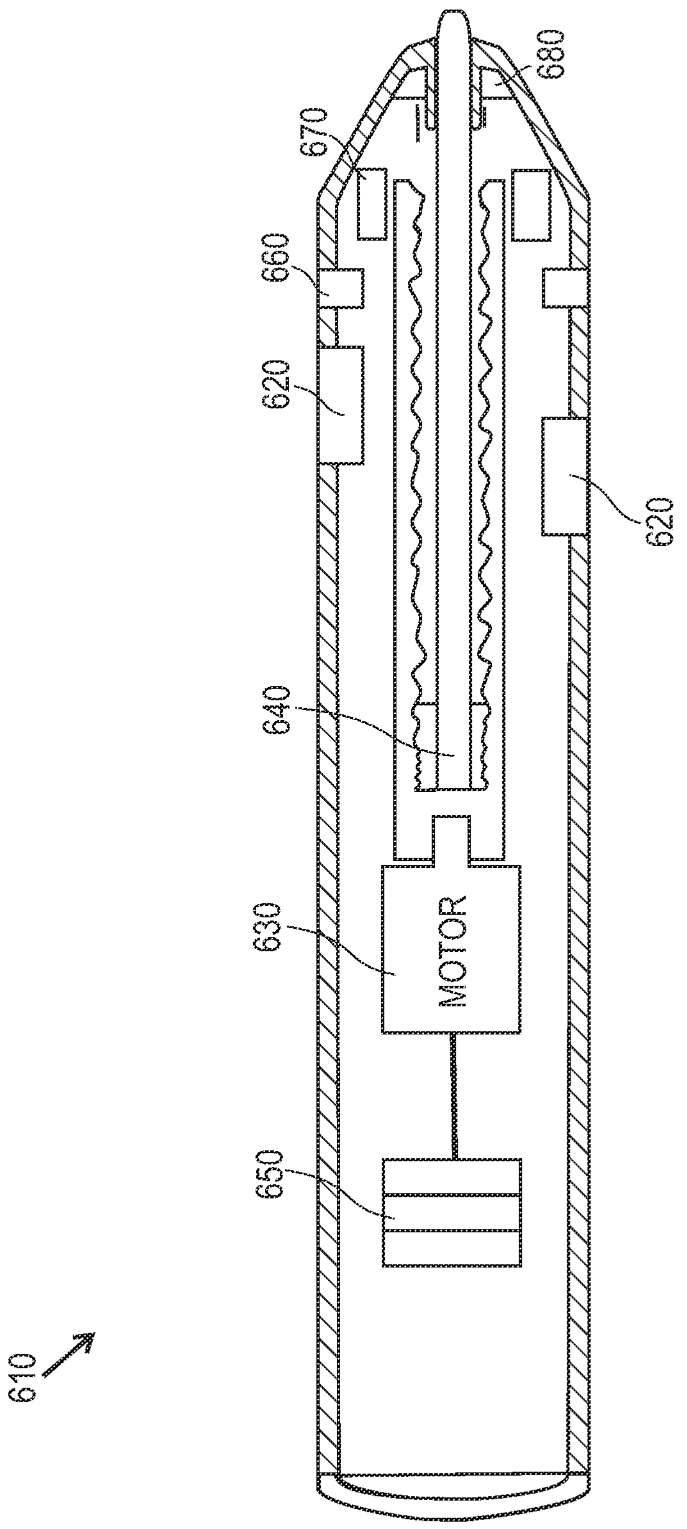
FIG. 6 illustrates a self-contained pen unit suitable for use in the system of FIG. 1.

FIG. 6 shows an alternative embodiment of a pen 610 which may suitably be used as the pen 110 in FIG. 1. In FIG. 6, offset sensors 620 detect that pen 610 is being properly gripped before motor 630 can be activated to advance a replaceable art supply, such as colored lead 640. Battery 650 supplies power to motor 630 and pen 610 is neither tethered or otherwise connected in use to a writing or work surface, such as tablet 150. A safety lock 660 is employed by an adult user, such as a parent to access the holder to replace consumable art supplies, such as lead 640. A proximity sensor 670 senses that pen 610 is sufficiently close to an appropriate working surface, such as tablet 150, before motor 630 is activated to drive the lead 640 so that it extends outwardly for usage. Additionally, a point emitter magnet 680 may be utilized in conjunction with a touch book, such as My First Leap Pad™ by Leap Frog.

Figure 7:
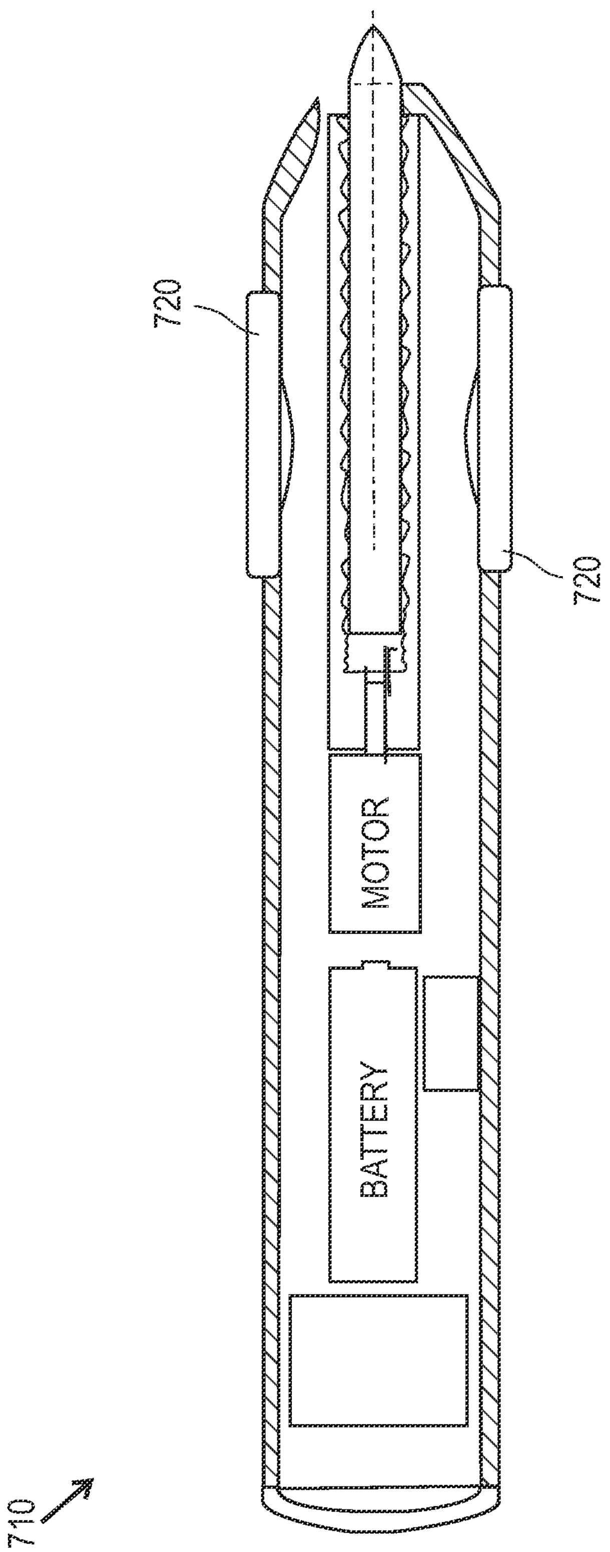
FIG. 7 illustrates a further self contained pen unit with grip sensors suitable for use in the system of FIG. 1.

FIG. 7 shows a pen 710 demonstrating a proper grip surface 720 for holding the art supply as well as demonstrating a fully covered and inserted slave art supply allowing for the hardware in master pen to detect a wear of a tip.

While FIGS. 2 and 6 show mechanisms to extend and retract an art supply tip including a DC motor and engagement of the screw feed system, it will be recognized there are alternative mechanical, electromechanical or motorized techniques which may suitably be employed for extending and retracting the tip or marker, or other art supply. One alternate approach to extending a consumable or non-consumable tip would use a solenoid driven advance mechanism, operating either as a rotary or linear incrementer. Another alternate approach to extend a tip would use a mechanical interlocking mechanism latched by a solenoid. In this approach, a user-activated mechanical linkage would advance the tip only when a second solenoid activated latch was also in a certain position. A double acting solenoid would move a latch into a position where the mechanical advance linkage would be allowed to advance the tip if the tool is within the approved work zone. If the tool is out of the usage zone, the solenoid would unlatch the linkage so that the tip could not be extended. If the tip is extended while in the usage zone, and then the tool is moved out of the usage zone, the solenoid would unlatch the linkage and the tip would automatically retract with a spring or other extensible device.

A master pen system or backing surface can contain a hidden override control, which can temporarily bypass the automatic retracting security features or other features such as changing emitter distance. This override control can be helpful for parents or older children who may want to utilize the art system not in proximity to a work surface. In this case, when a slave tip is inserted into a master holder, the tip will automatically protrude. This feature allows older children to use the system unencumbered, but when the override is not in use, still provides a measure of safety for other younger children in the home.

FIGS. 8A and 8B illustrate aspects of alternative mechanisms 810 and 820 for disabling use of the art supplies when not in sufficient proximity to an appropriate work surface. In these figures, a retractable cap opens and closes to expose or cover the marking component appropriately. As seen in FIG. 8A, retractable arms 812 and 814 are shown closed. In closed position, these arms 812 and 814 both prevent a tip such as a marker from drying out, as well as, misuse of the marker. FIG. 8B shows a slave tip 820 for use with a holder. The slave tip 820 also employs retractable arms.

Figure 9:
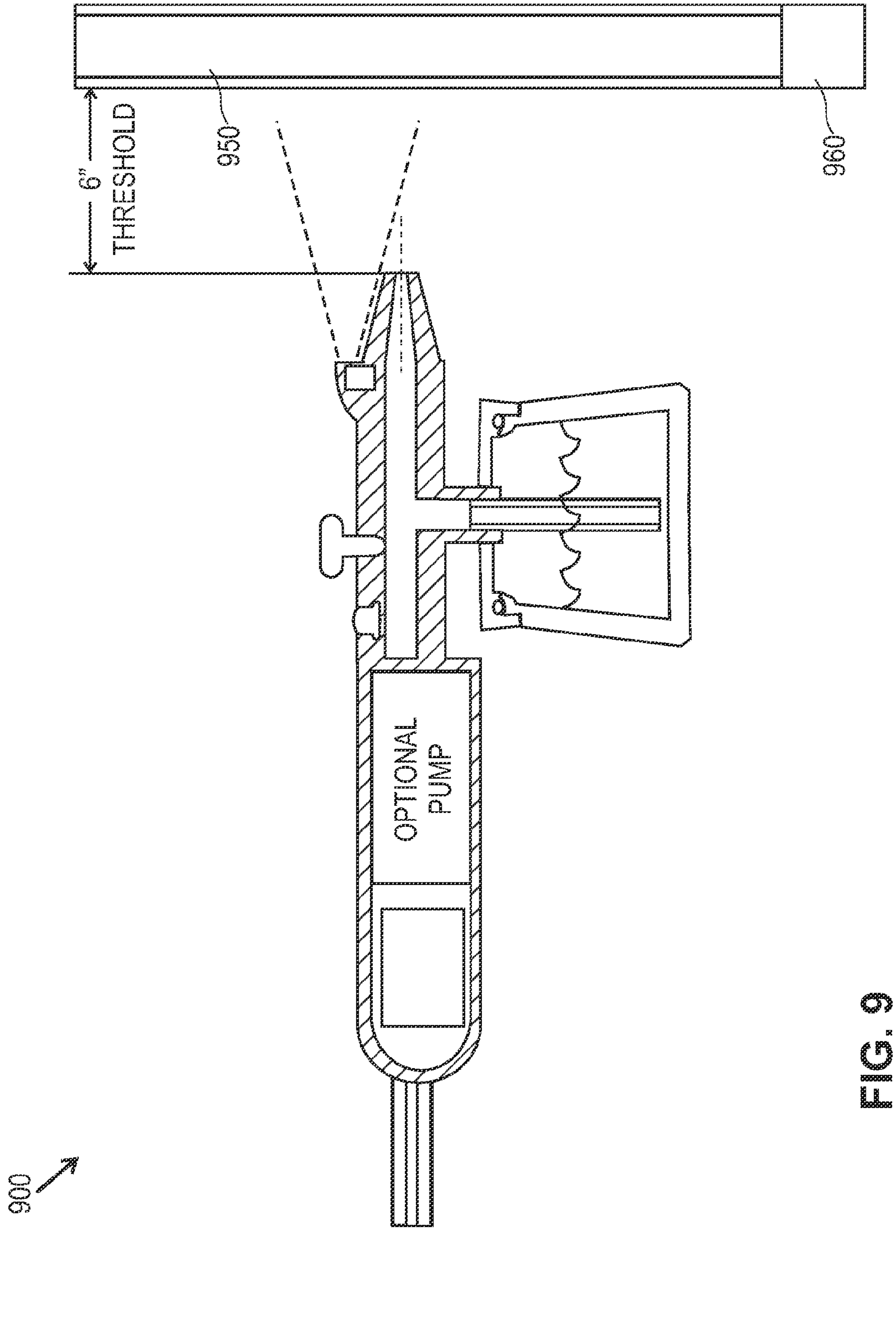
FIG. 9 illustrates a spray pump system in accordance with the present invention.
Figure 10A:
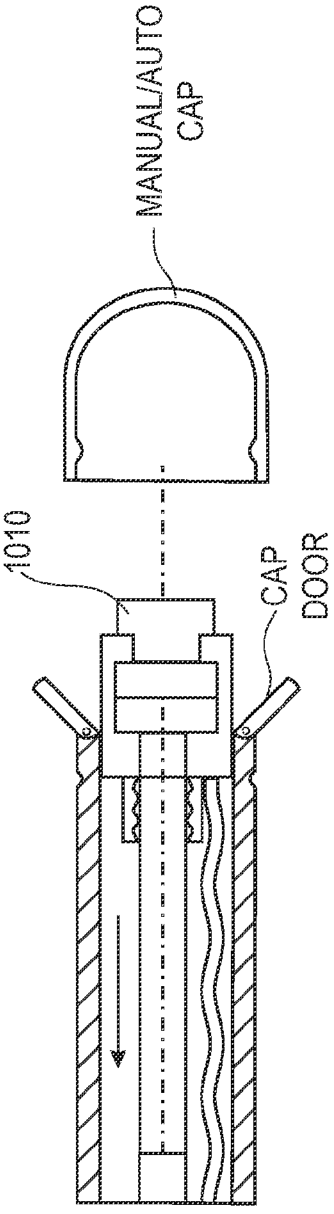
FIGS. 10A-10D illustrate internally or externally fed brush, roller and stamp tip embodiments of holders.
Figure 10B:
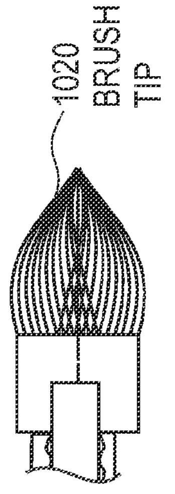
Figure 10C:
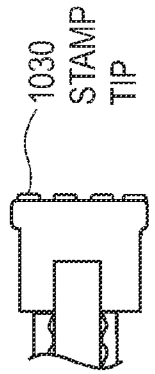
Figure 10D:
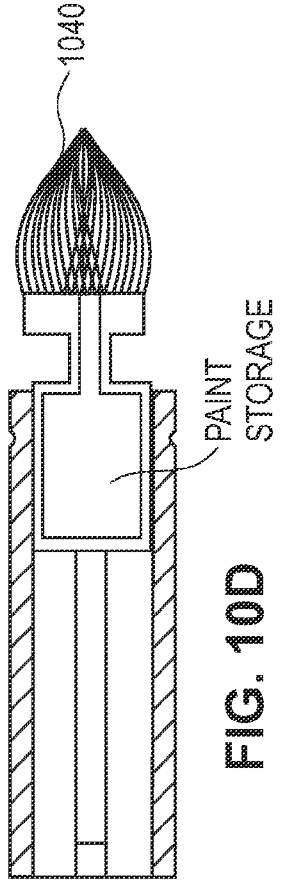

FIG. 9 shows a master spray or pump roller system 900 which may suitably employ commonly known spray and pump mechanisms which can be either manual or automatic pressurization systems located in the master holder, backing surface or independently. In another embodiment, the container could be pre-pressurized, so no other pressurization means is necessary. A power source would be required to operate an automatic pump or sprayer. The pump may also have a pressure level adjustment. The master spray pen could contain a receptacle for a non leak snap on fitting for the containers. The spray pen would have a proximity sensor and possibly a directional sensor to make sure that the spray implement can only become active when a certain distance from and when pointed at a backing surface 950 or compliant paper. The required activation distance could also reduce misting, since the system 900 will not activate far from the backing tablet. In an active compliant state, the spray button will function when pressed. The spray tip pattern and intensity could be altered by adjusting the nozzle. In addition, different tips can be exchanged.

In the case of a roller brush, or stamp system that utilizes a liquid feed, the pump becomes active only when the master unit is in the proper zone and orientation. The user can press the pump button or manually squeeze to increase the flow of material to the roller or stamp. The pump button could inject a predetermined amount and not allow additional pumps by the user for a certain length of time while in the compliant zone thereby reducing the chance of over filling the tip. The roller, brush or stamp system will also employ a retracting and extending system for compliant and non compliant states.

The automatic fill system for the slave roller, brush and stamps could include a tube connection means to receive fluid from the master pen or pump. An automatic capping, covering or sealing means or manual cap can be utilized so they do not dry out. Various slave rollers, tips and stamp colors and patterns may be employed. In some cases, these slave tips, rollers and stamps could also be removed and washed. A special tool or parental override control can be provided to expose the retracted tips for washing.

FIGS. 10A-10D illustrate tips 1010, 1020, 1030 and 1040, respectively, for use in conjunction with the present invention. A retracting roller tip 1010, brush tip 1020 or stamp tip 1030 may allow for a manual dip application of marking material rather than using an internal pump method. A dip station, such as paint holders 130 of FIG. 1, will be located in a compliant usage zone so the tip will be exposed to receive the paint only when in proximity to an acceptable painting surface, such as the holders 130 and paper 128 on the tablet 150.

Additional anti-drip systems can be utilized in the dip station to remove excess liquid or gels. Lastly, a roller brush or stamp can have an internal source of ink, liquid, gel, or glue located in the slave implement. A liquid glue tip can maintain a protruded state, however, the flow of material would be controlled by controlling a valve much like spray and pump systems described above. For example, squeeze, pressurized, gravity fed or other glue applicators in accordance with the present invention may employ a mechanism that stops the flow of glue when the glue pen is not in proximity with the proper surface. In addition, if the glue is removable from the master pen, it will then become disabled when removed. If a brush tip for example, has a passive feed reservoir, it would only require the tip to be exposed or covered like other non wear tips.

The brush tips, for example, can selectively be controlled to retract or protrude. The open containers of paint could be located in a compliant zone, thus allowing the child to manually dip the brush into the paint. The child could also have a manual wash station and the child could change brushes for different colors. In a preferred embodiment, the child could insert the brush into a paint receptacle with a small opening. Once inserted, the tip could dip into the material and when withdrawn, an internal wiper blade could remove excess paint. Thus, the child has a consistent amount of paint on the brush at each refill which will reduce or eliminate dripping. A similar system could be utilized for rinsing a tip. Once a tip is inserted, a sensor or switch could turn on a motor or air driven washing system which swirls the water around and rinses material off the tip. This same result can also be achieved by pressing a wash button or by a manual means. An internal wiping blade or roller system could then be employed to remove excess water. As another option, while in the dip or rinse station, the tip could be commanded to spin to remove any excess.

A secondary safety system may be advantageously employed in combination with the proximity compliance system and addresses the specific attributes of the implement as described above. The secondary safety system further addresses specific categorical elements of the marking substances. In addition, the secondary system ensures that marking substances cannot be utilized when not connected to the system and when not in compliance.

If the RF signal is multidirectional and the sensor is multidirectional, the implement could display that it is active, and it could require the user to press a button to activate the implement rather than automatically activating. Such an approach is especially useful with a spray device, cutting device or to avoid the potential for ingesting the cores.

A slave art supply or master pen can contain several color palette options inside one implement housing. A specific color could be selected with a rotating or revolving turret design or using other known multi color selection systems. A color selector control would be included that can contain an indicator light, voice indicator or color strip showing which color is active. The system could contain a pressure detecting spring switch or other means in the pen which determines if too much downward force is used. This occurs when a child digs a pen or other implement into the paper rather than using it for drawing. This excessive pressure could cause the tip to retract for a few seconds or require the child to remove the pen from the surface and return it to the surface, or use other indicators to warn the child of improper use.

The slave art supplies are designed to be in a retracted state when not in use. This can be achieved in a variety of ways. The mechanism to expose the art supply can utilize a kind of recessed or lock and key actuator point. The master holder can contain the key. Many types of specialized lock and key actuating methods can be used. Just like the master holder, slave art supplies may contain subtle differences in design based on the art supply categories previously mentioned. A slave art supply can consist of the following components: a manual or spring loaded hinged or motorized automatic cap; extending tube or fingers to block access to the tip; an optional spring tip rim switch for wear tips and connector means to attach the switch to the master pen; a means of attachment of the slave tip to the master pen; a mechanical or electronic means of communicating the color or other attributes of the slave pen to the master pen spring loaded or other mean to automatically retract when removed from master pen. Other sensing means can be utilized to determine the length of the consumable marker. This spring tip or sensor could also be located on the master pen.

Color specific and marker type, either consumable or fixed, ID indicators that trigger switch patterns in the master pen when inserted, a recessed screw, a fixed travel distance for non wear pens. A fixed movement, locking extension, piston type spring loaded pen could also be utilized. In one embodiment, slave tips for consumable implements may consist of an outer housing tube an indexing backing plate nut with a screw hole pattern in the center or on the outer edge and a screw to continuously index and feed the consumable implement tip. The nut or other driver would be securely fastened to the consumable material, so the consumable material cannot be pulled out. Slave pens could also be a holder for certain standard sized art supplies like crayons and markers. Parents can load and lock these art supplies into the slave pen casing. The slave pens are in a retracted state when in inserted and non compliant or when removed from the master pen.

The slave pens could be spring loaded with a safety latch which will automatically cause the tip to retract when removed from the master pen. An alternative method, the slave pens will temporarily lock in place when connected to the master pen when the tip is extended. Thus, when the motor in the master pen retracts the tip fully, the locking mechanism is released. Lastly, the slave pen can be locked in place into a master pen until a release button or mechanism is manually activated and the tip is also automatically retracted. Before any manual power off can be achieved the control system will retract the tip.

Figure 11A:
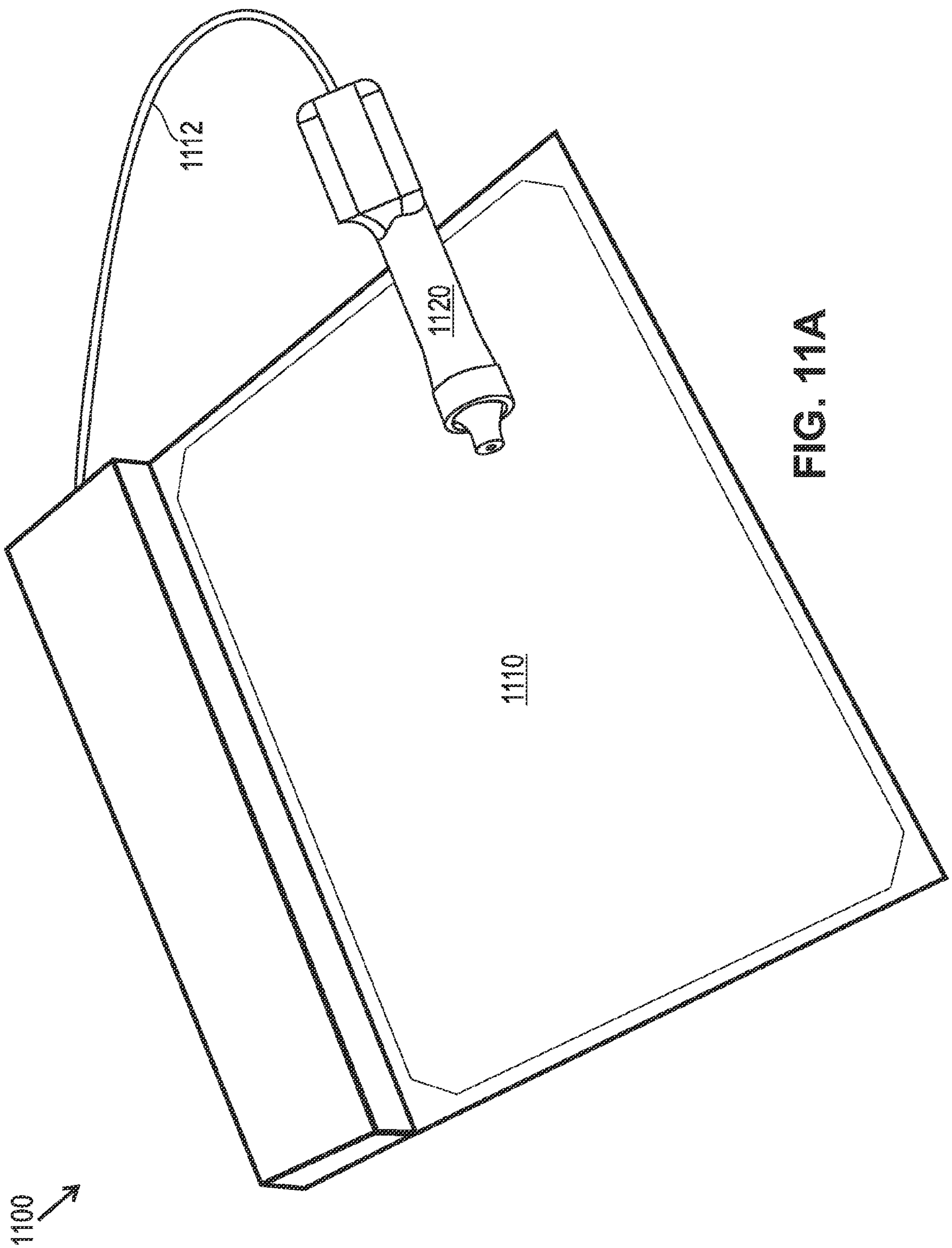
FIGS. 11A and 11B show aspects of a second embodiment of an art system in accordance with the present invention.

FIG. 11A illustrates an actual working prototype of a system 1100 in accordance with the present invention. System 1100 comprises a tablet 1110 and a pen 1120 which is connected to the tablet 1110 by a tether 1112. The electronic subsystem, a printed circuit (PC) board, a battery box and a transmitter antenna, are located in the tablet 1110. The tethered pen 1120 contains a receiver antenna, a drive motor, sensors and mechanical components. Mechanical details are described below in connection with the discussion of FIGS. 12A, 12B and 13.

The electronic subsystem of tablet 1110 comprises a power supply, an encoder module for the transmitter antenna, a transmitter antenna coil, an amplifier module, a microcontroller which decodes the signal, reads tilt switches and limit switches, and drives the motor and other outputs, such as lights, speech, music, or the like as needed.

The retractable pen holder unit includes a receiver antenna coil near the tip of the pen 1120, a motor that drives the pen or marker tip in and out through a mechanical mechanism, extension and retraction limit switches, and a tilt or orientation switch or switches.

The proximity sensing system used in the prototype unit is referred to as a low frequency magnetic transmission (LFMT system). A feature of this transmission approach is its low power consumption and short range. In some applications, a short range would be considered a disadvantage, but in this case a short range is highly advantageous as addressed further herein.

Figure 11B:
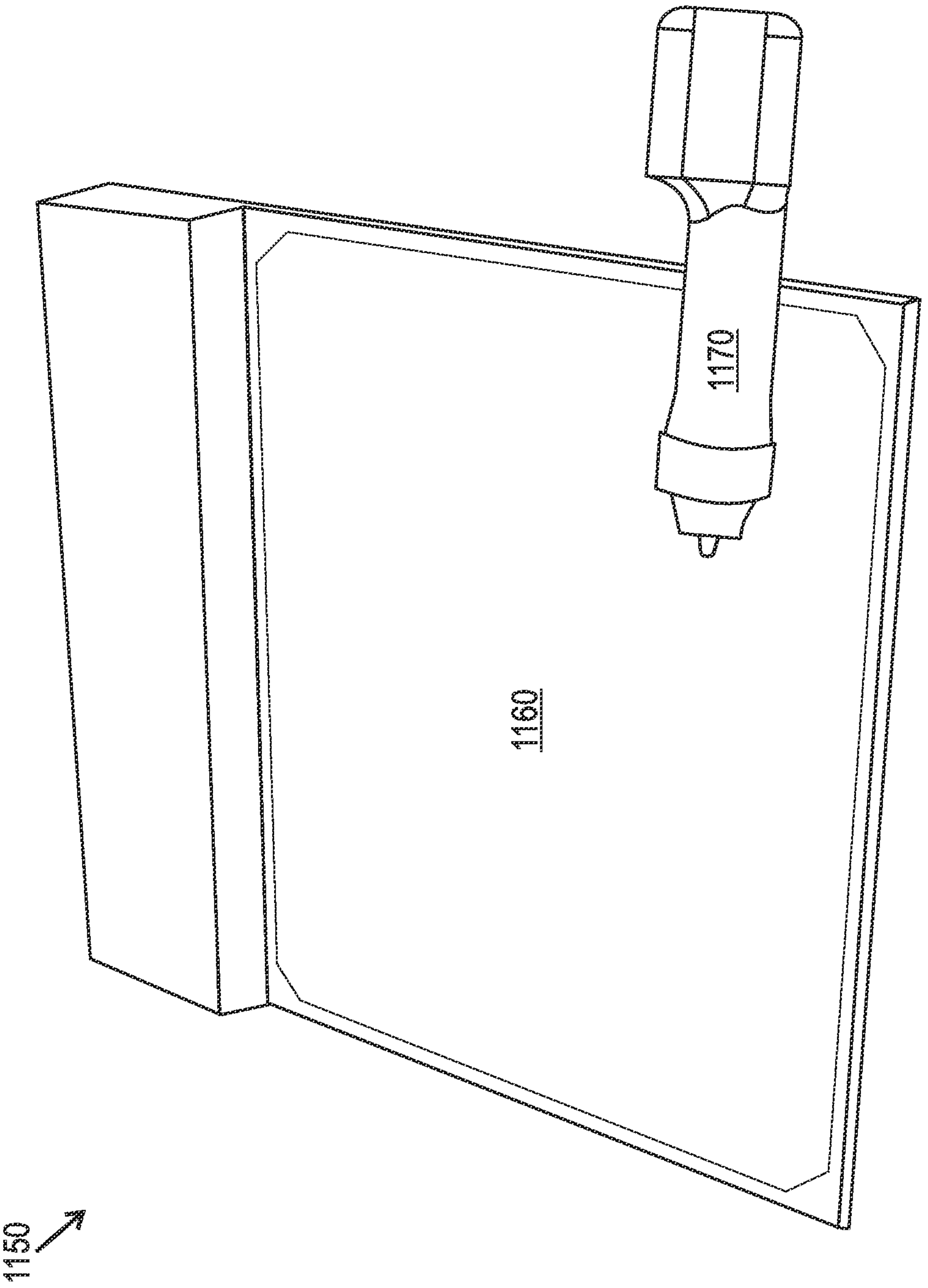

The retractable pen assembly could also be implemented as a system 1150 employing a tablet 1160 and a non-tethered, independent pen 1170 as shown in FIG. 11B. In this approach, pen 1170 has its own battery power supply sufficient to meet the needs of the drive motor for a desired number of operation cycles. Pen 1170 would also need a separate microcontroller, signal amplifier and decoder. Furthermore, if any reciprocal communication is desired from the pen 1170 back to the tablet 1160, the pen 1170 would also need to include a driver to transmit a signal through a pen antenna coil. The microcontroller in the tablet or base unit would then decode any signal received from the pen and provide outputs appropriately.

In the tethered system 1100, the microcontroller controls a transmitter coil, reads all inputs including the received signal, tilt sensors, travel limit sensors, and outputs to the motor driver circuit of the pen 1120 through a wire connection in the tether 1112. A transmitter antenna coil in the tablet is driven by the microcontroller and transmits a signal which is received by a receiver antenna coil in the pen. An op-amp amplifies the signal received by the receiver antenna coil. Tilt sensors in the base and in the pen produce signals evaluated by the microcontroller to determine if the system is being used appropriately as discussed further below. The electronics also suitably includes a travel limit sensor or sensors in the pen and a motor driver H-bridge module.

The system is started by either powering up the base unit or switching on a start switch. The microcontroller then begins to continuously send a relatively low frequency pulse or encoded signal through a driver to a planar antenna loop formed in a spiral or other form appropriate for transmitting a signal over a short range. The handheld pen unit contains an antenna receiver coil. This coil receives the transmitted energy, which is then amplified by an op-amp, filtered, and sent back to the microcontroller. The microcontroller decodes the signal and rejects any signals without the proper encoding or signal strength. Thus, if the pen is too far from the tablet, the signal is not strong enough and the system does not begin operation or if the pen moves from a position in the compliant zone to a position out of the compliant zone, the art supply is retracted and the system powers down. Similarly, a signal from some other transmitter is distinguished and does not cause the system to operate.

When a proper in range signal is received, the microcontroller compares the inputs of a tilt or orientation sensor on the tablet with another tilt sensor in the pen unit. Since one desired function is to prevent the use of the pen on a surface other than the desired area of the tablet as well as to avoid ingestion, it only allows the pen to function if one sensor is approximately horizontal and the other is approximately vertical.

If the pen unit is within range of the tablet and they are in the proper relative orientation to each other, the controller will check the position of the art supply crayon, marker, pen, or the like in the holder unit. It does this by polling, the travel limit sensor or sensors in the holder. If the art supply is retracted, the motor is driven such that the art supply will be extended an appropriate amount. If the supply is already extended, it will do nothing.

The microcontroller continuously performs these functions many times per second. If at any time either the pen is found to be out of range of the tablet or the pen is found to not be in the proper orientation relative to the tablet, the microcontroller will drive the motor to retract the implement or cover the tip.

The shape of the transmitter antenna should be designed and selected for reliable operation and proper shaping of the transmitted magnetic field. A well engineered base antenna receiver coil and appropriate signal processing software are desirable to avoid weak signed areas in the compliant zone, as well as strong areas outside that zone. Proper shielding may also be employed to prevent some stray signals, such as signals received behind and to the sides of the base unit.

The tilt sensor pair or other orientation sensing means should be designed so that normal use of the pen will not lead to inconsistent contact in the tilt sensor in the pen so that spurious retraction and re-extension of the art supply does not unduly occur. Further, a design that is insensitive to shaking is desirable given children's propensity to shake toys.

Figure 12B:
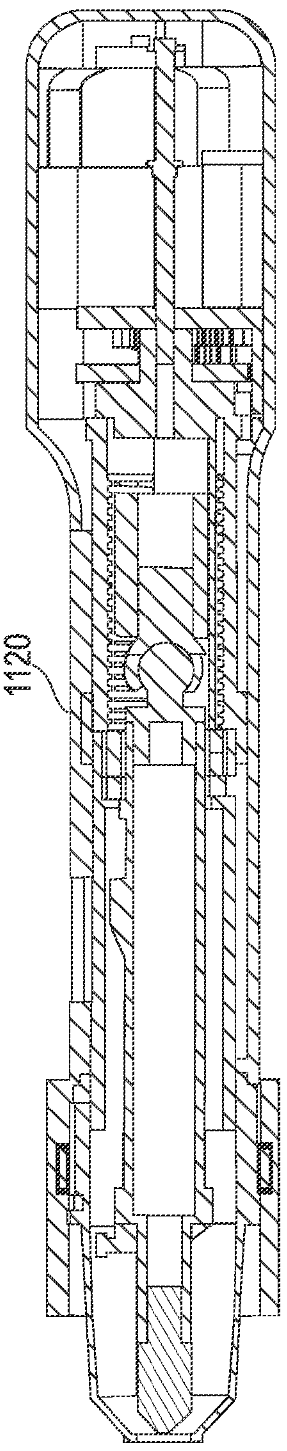
FIGS. 12A and 12B show a holder housing suitable for the art supply of FIG. 11A and a gear box cross section drawing for that art supply.
Figure 12A:
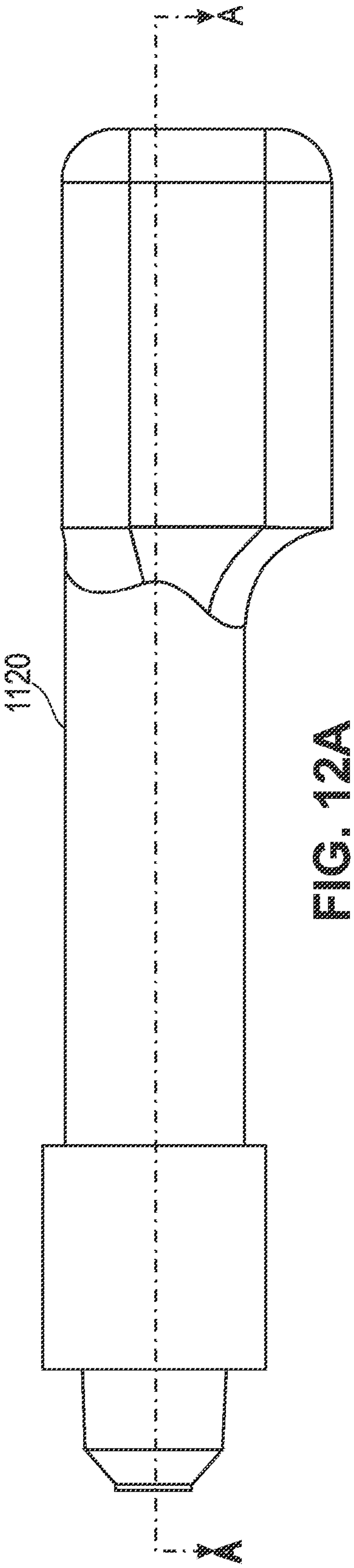

Turning to mechanical aspects of the prototype system 1100 of FIG. 11, FIGS. 12A and 12B show the housing of pen 1120 and a cutaway cross-sectional view along line A-A of its internal mechanical details, respectively.

Figure 13:
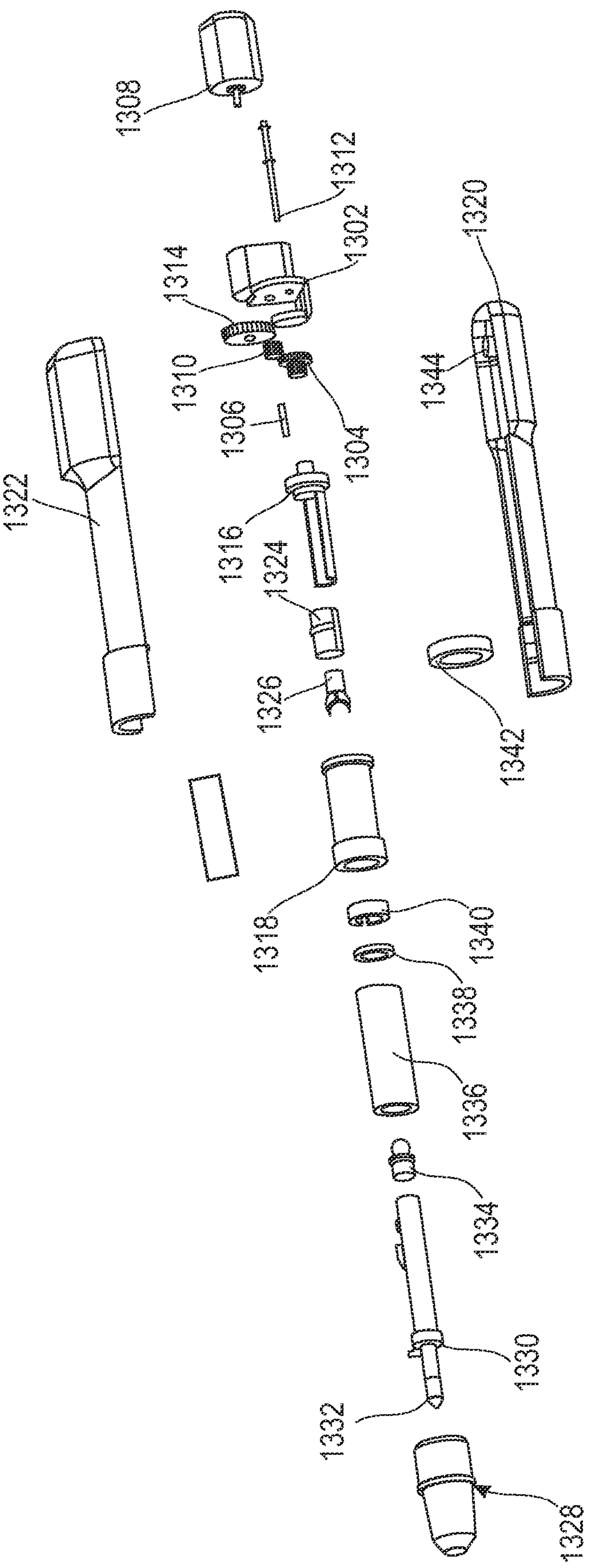
FIG. 13 is an exploded perspective gear box assembly drawing for the holder and art supply of FIGS. 12A and 12B.

FIG. 13 shows an exploded perspective view of the gear box assembly of the pen 1120 which employs the following elements: gear plate 1302, spur gear 1304, gear shaft 1306, motor 1308, spur gear 1310, shaft 1312, spur gear 1314, drive paddle marker 1316, main threaded barrel barker 1318, lower case housing 1320, upper case housing 1322, carrier 1324, carrier socket 1326, housing 1328, marker pen 1330, marker nib 1332, ball end cap 1334, housing 1336, lock ring 1338, lock ring retainer 1340, coil 1342 and switch 1344.

Figure 14:
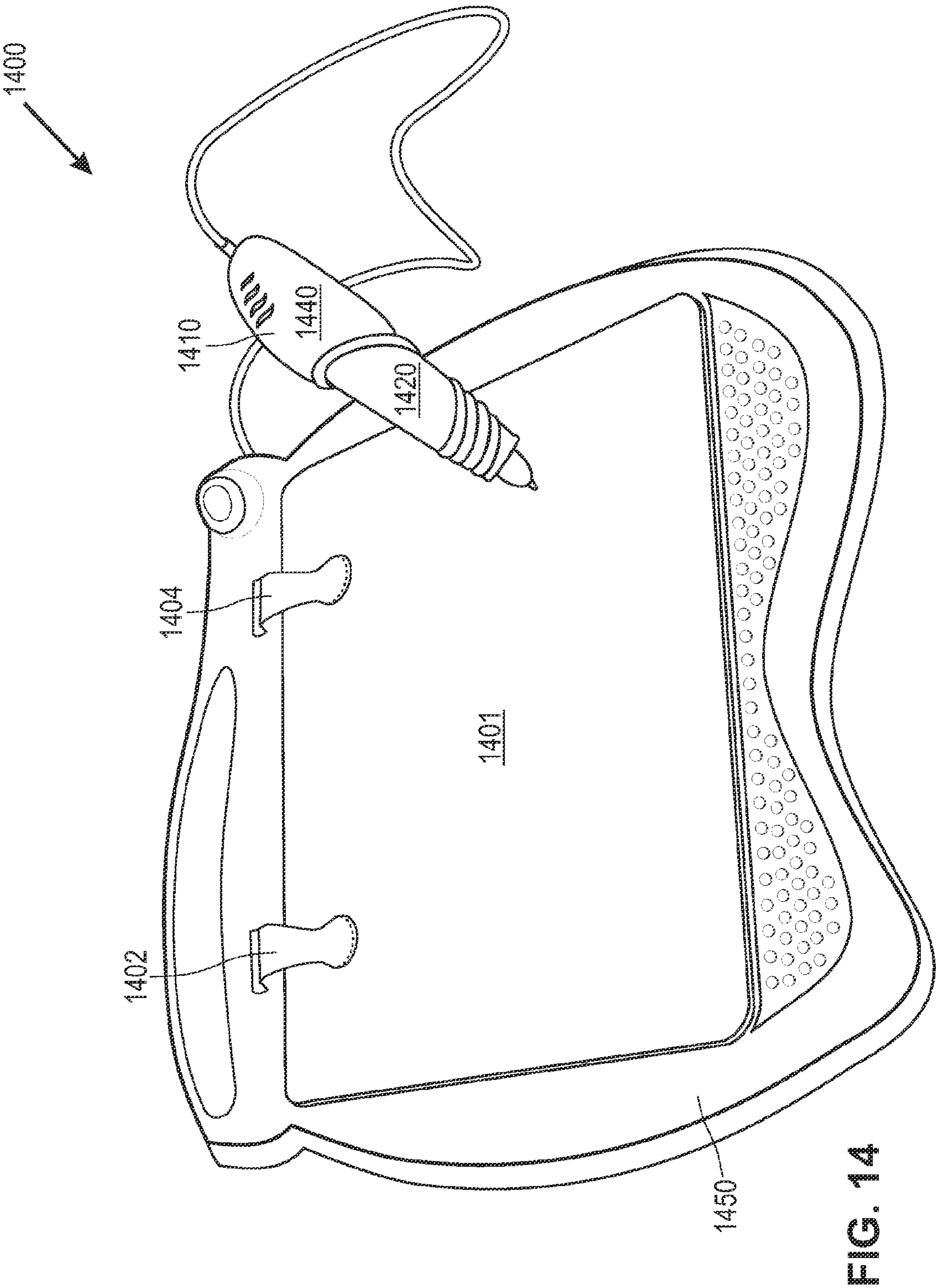
FIG. 14 shows a third embodiment of an art system in accordance with the present invention.

FIGS. 14-18 illustrate aspects of a further embodiment of an art system 1400 in accordance with the present invention. As seen in FIG. 14, a user of the system places paper 1401 under clips 1402 and 1404 of tablet 1450 and uses retractable pen 1410 to safely draw on the paper 1401. While we refer to the drawing implement as a pen, the pen of this embodiment comprises a replaceable art supply portion 1420 which may or may be a pen and a holder 1440.

Figure 15:
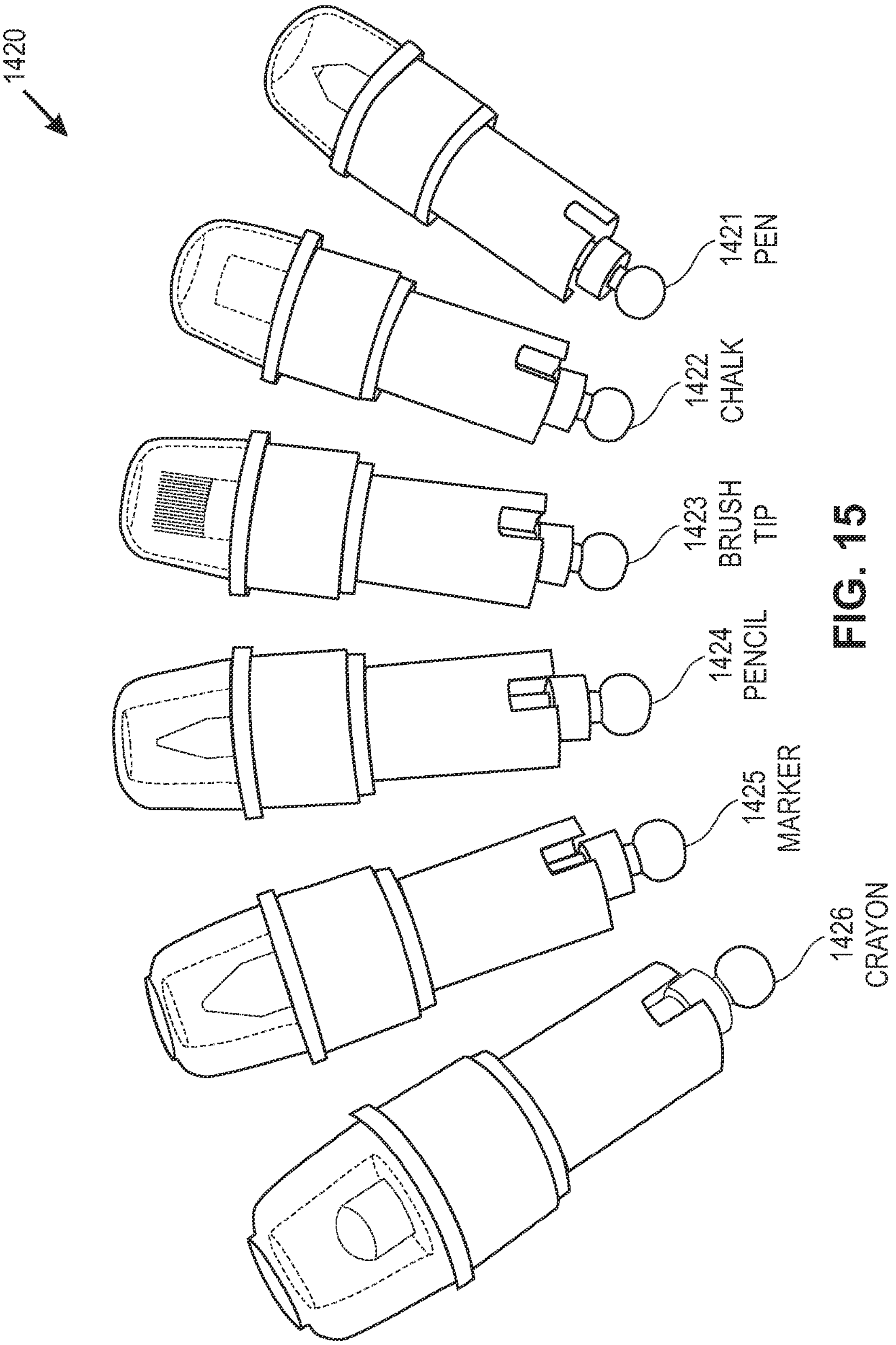
FIG. 15 illustrates a variety of interchangeable, interlocking, disabled art supplies suitably utilized with the system of FIG. 14.

As seen in FIG. 15, the art supply portion may suitably comprise a wide variety of art supplies, such as pen 1421, chalk 1422, brush tip 1423, pencil 1424, marker 1425 or crayon 1426. While exemplary art supplies are shown in FIG. 15, it will be recognized that others may also be provided as desired.

Figure 16:
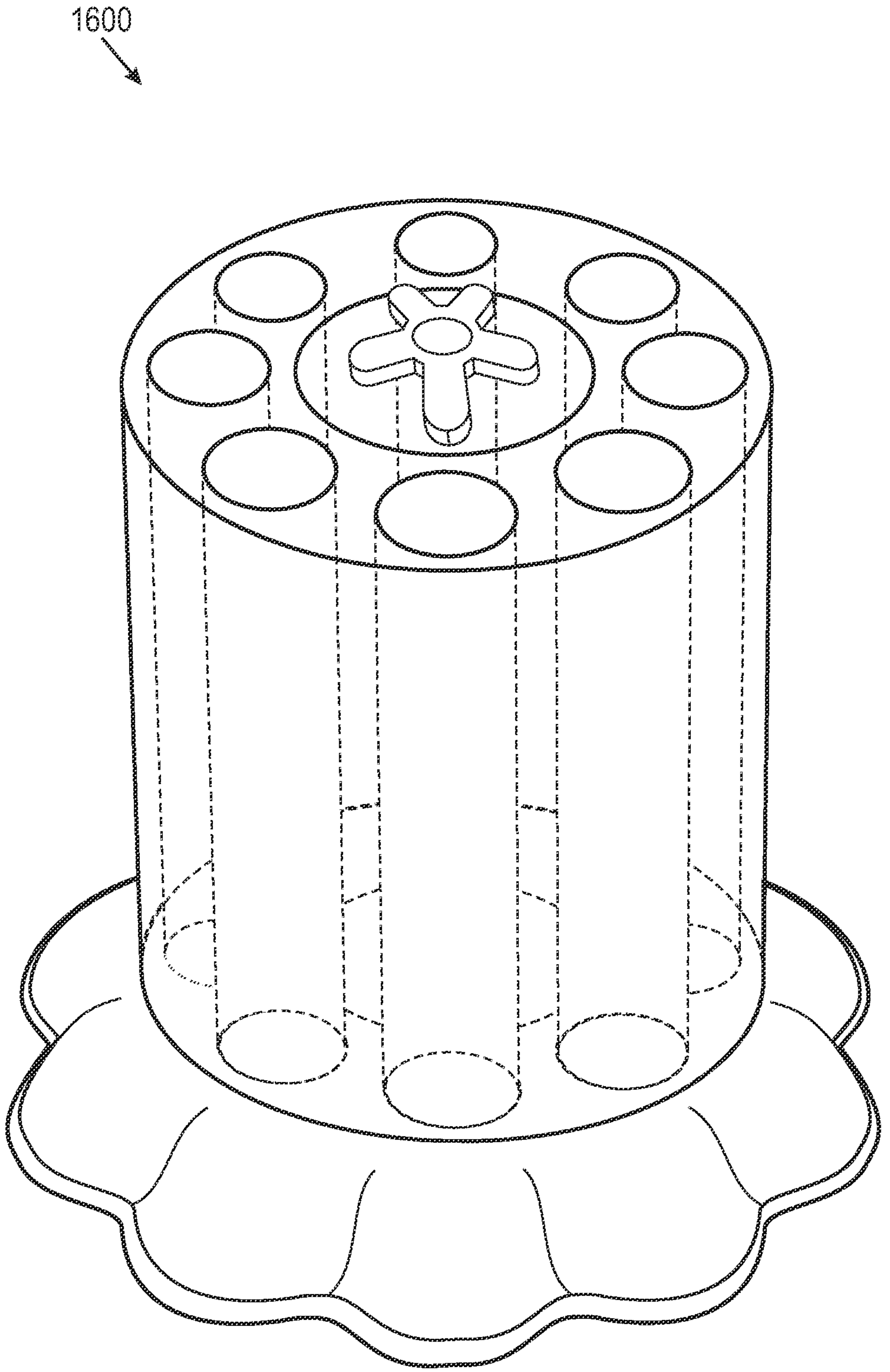
FIG. 16 illustrates a canister spinner for holding art supplies, such as the supplies of FIG. 15, when they are not being used.

When not in use, art supplies or cartridges such as the art supplies 1421-1426 may suitably be stored in a rotary canister storage container 1600 as shown in FIG. 16.

Figure 17A:
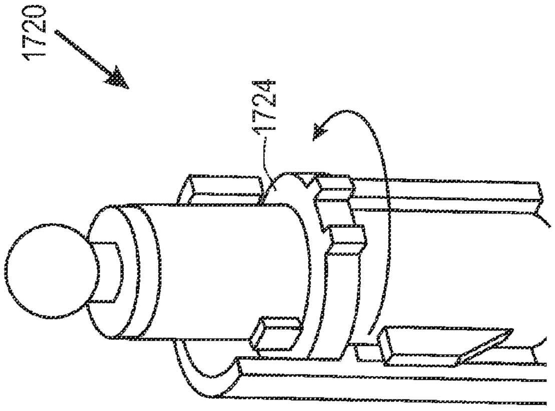
FIGS. 17A, 17B, 17C and 17D illustrates aspects of an illustrative locking arrangement for maintaining a disabled state and loading art supplies like those of FIG. 15 into holders according to the present invention.
Figure 17B:
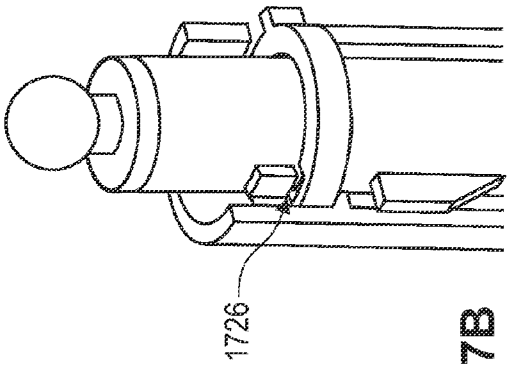
Figure 17C:
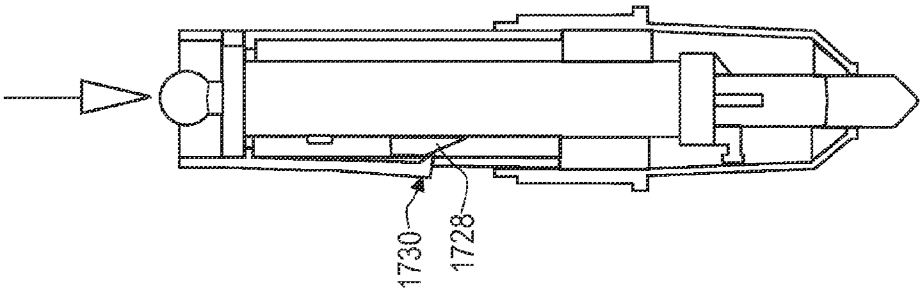
Figure 17D:
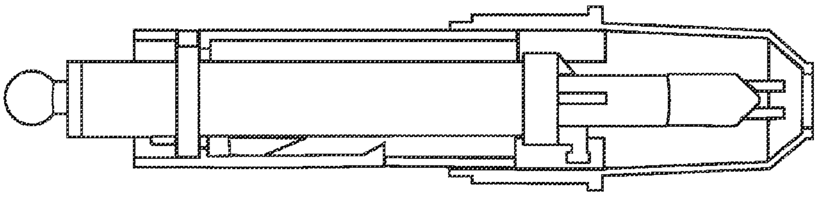

As illustrated in FIGS. 17A, 17B, 17C and 17D (collectively FIG. 17) and FIG. 18, a locking arrangement is preferably employed so that when an art supply or cartridge is selected for use, it is locked in place before the art supply is exposed for use. As seen in FIG. 17, when a cartridge 1720 is loaded into a holder, such as holder 1440, a lock ring 1724 twists to expose a slot 1726 allowing an art supply, such as the pen, to extend. When the pen is extended, a rib 1728 on the pen forces a tab 1730 outward locking the pen in place and preventing its removal from the handle while the tip is extended. FIG. 17D shows the pen retracted.

Figure 18:
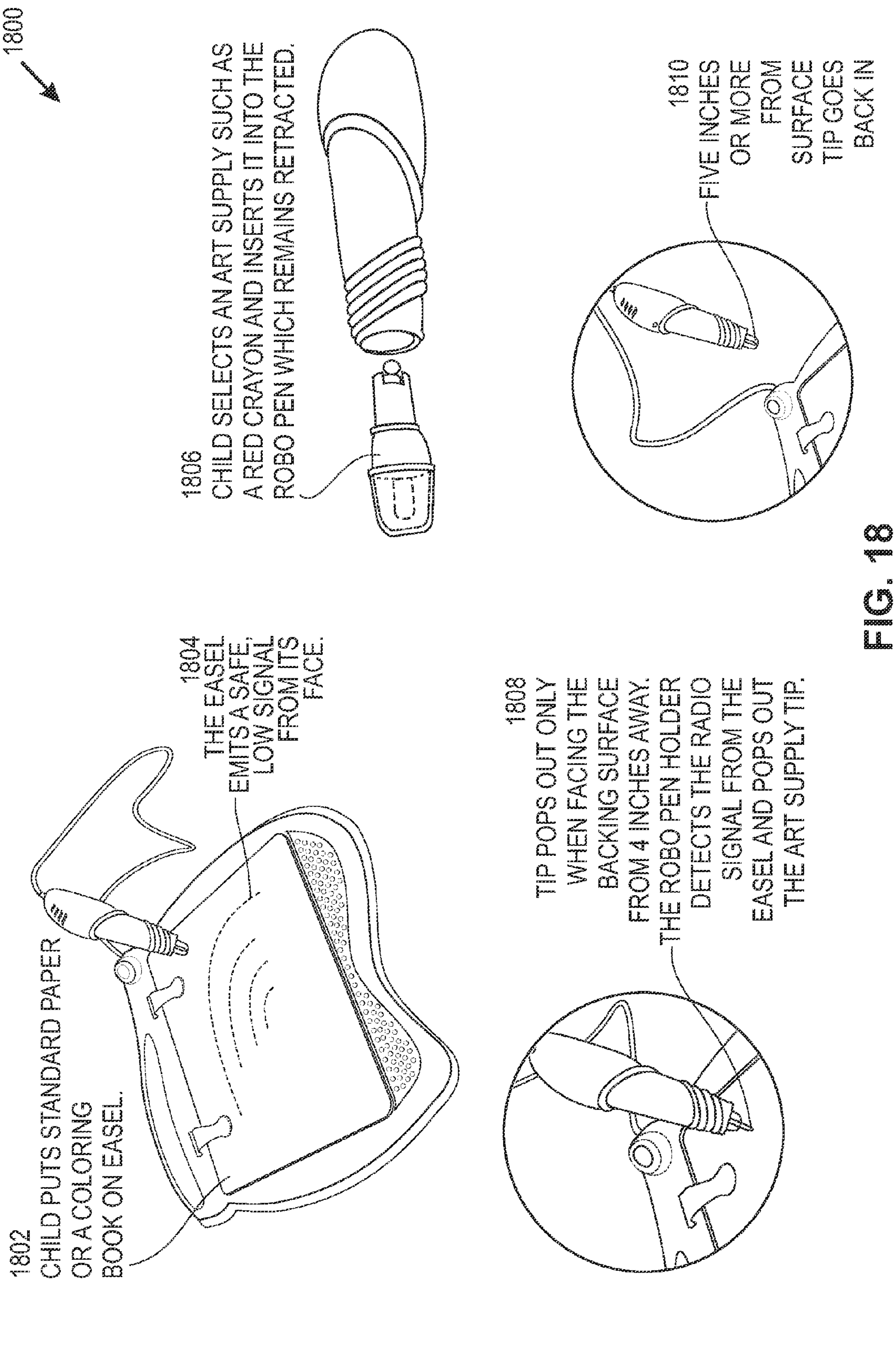
FIG. 18 illustrates a process of using an art supply system in accordance with the present invention.
Figure 19:
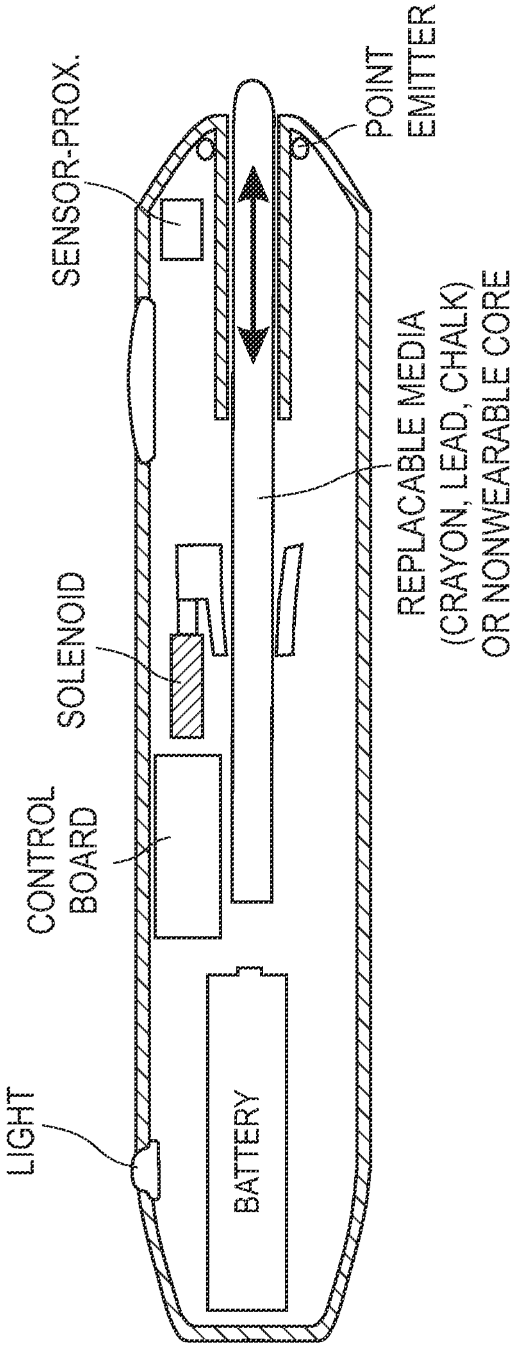
FIGS. 19-22 illustrate additional aspects and embodiments of the present invention.
Figure 20:
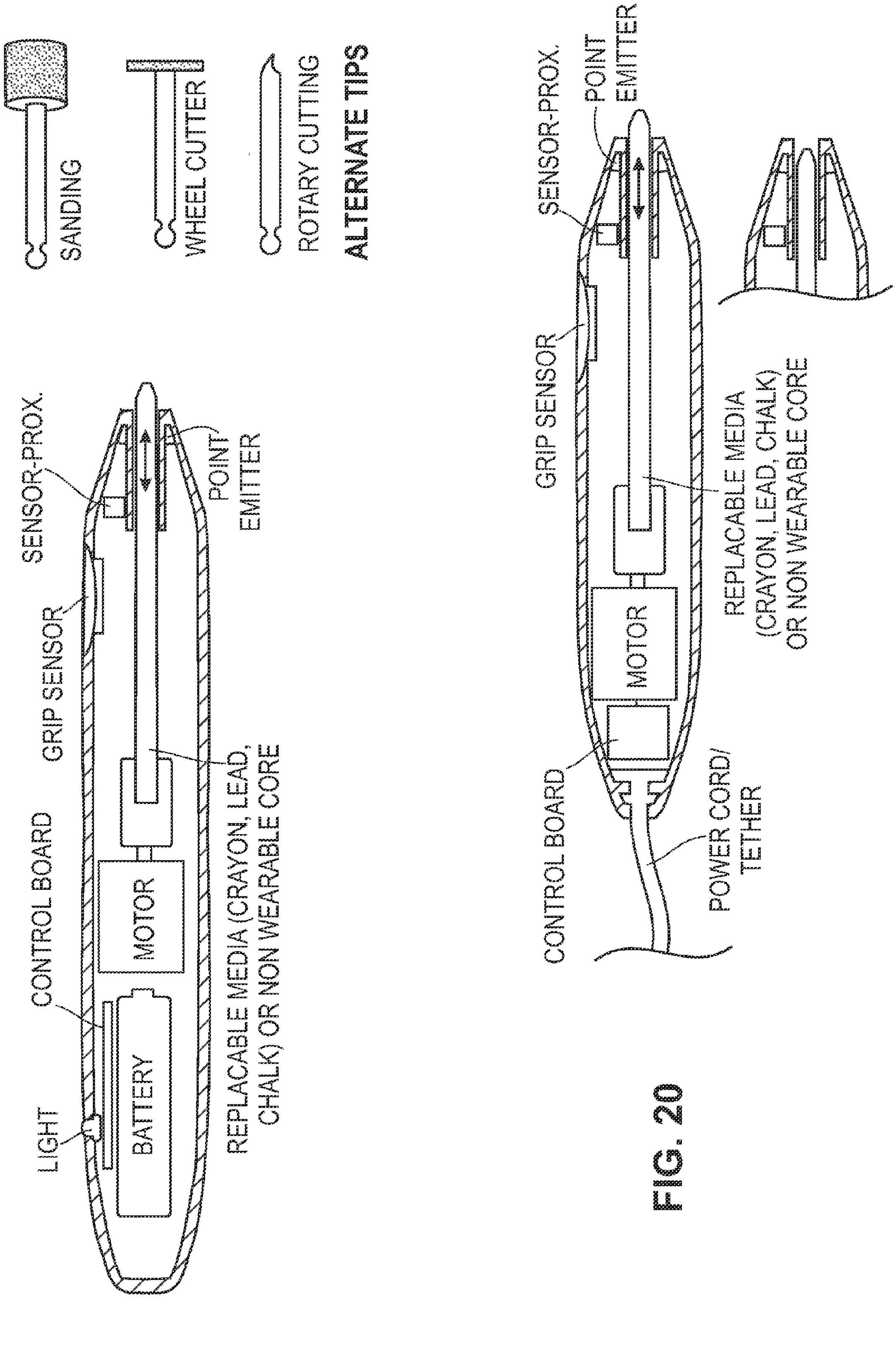
Figure 21:
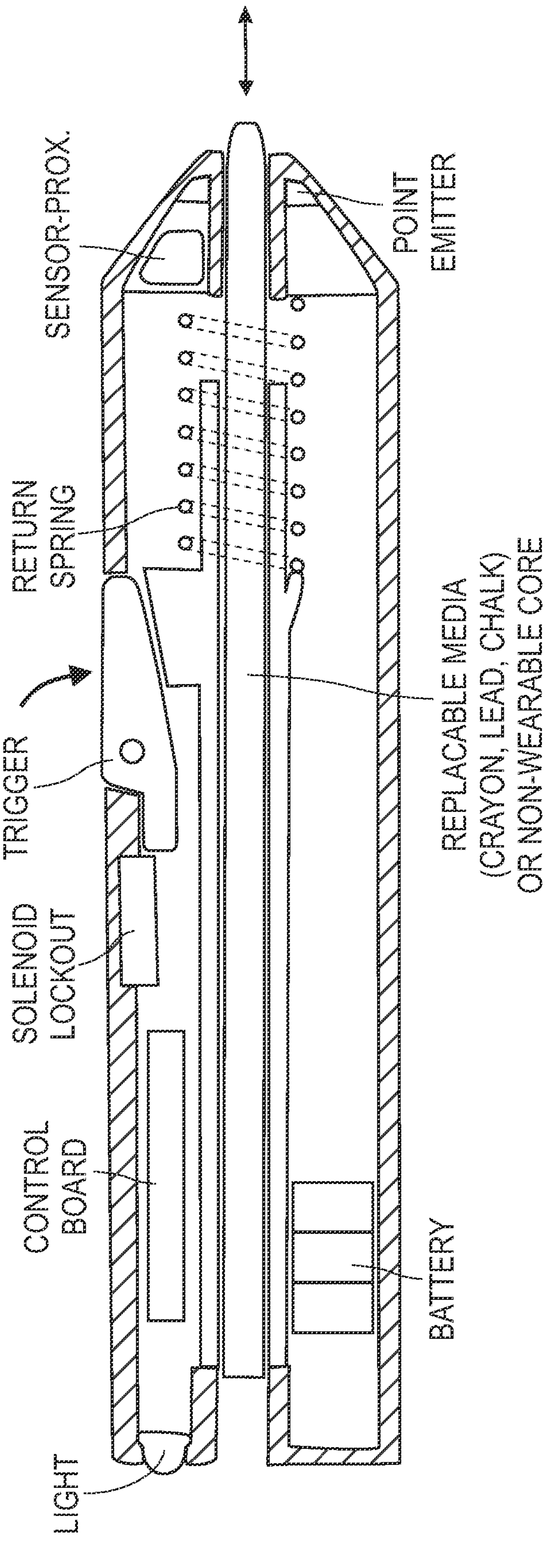
Figure 22:
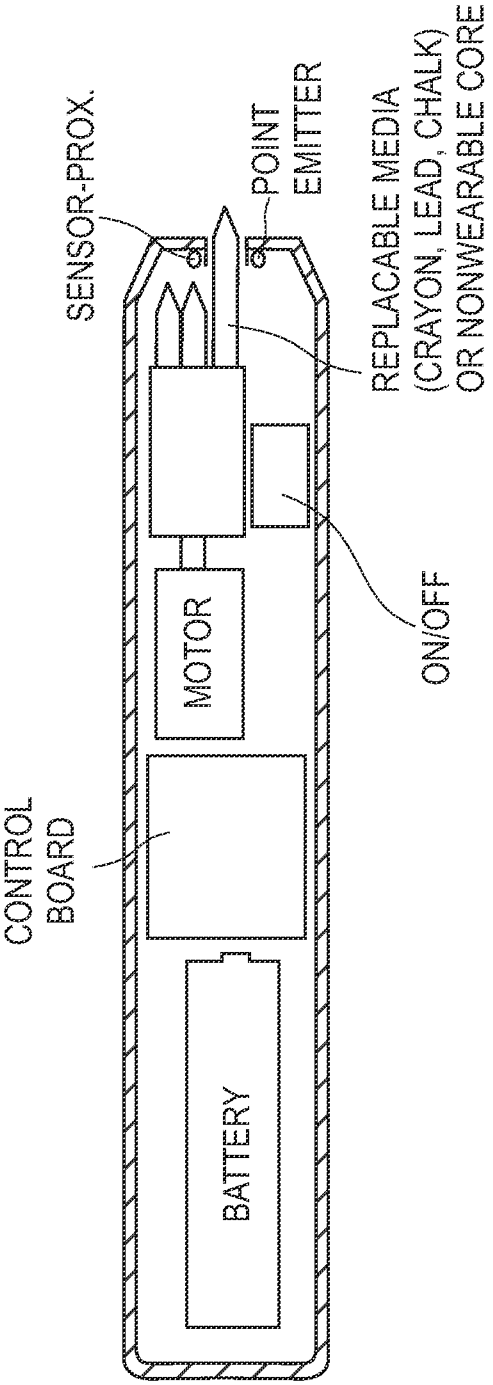

FIG. 18 shows a process 1800 of using art systems, such as system 100, 1100 or 1400, in accordance with the present invention. In step 1802, a child or parent puts a work surface, such as standard paper or a coloring book on an easel. In step 1804, the easel emits a safe, low signal from its face. In step 1806, the child or parent selects an art supply such as a crayon and inserts it into the holder where it remains retracted. In step 1808, the child moves the pen to the easel surface. When the pen is within a safe distance, such as four inches, the easel's signal is detected and the art supply tip pops out for use. In step 1810, when the child tires of drawing or otherwise takes the pen a predetermined distance away from the easel, such as five or more inches, the signal from the easel has less than a predetermined signal level and the surface tip is retracted.

FIGS. 19-22 illustrate various other aspects and embodiments of the present invention.

Figure 23:
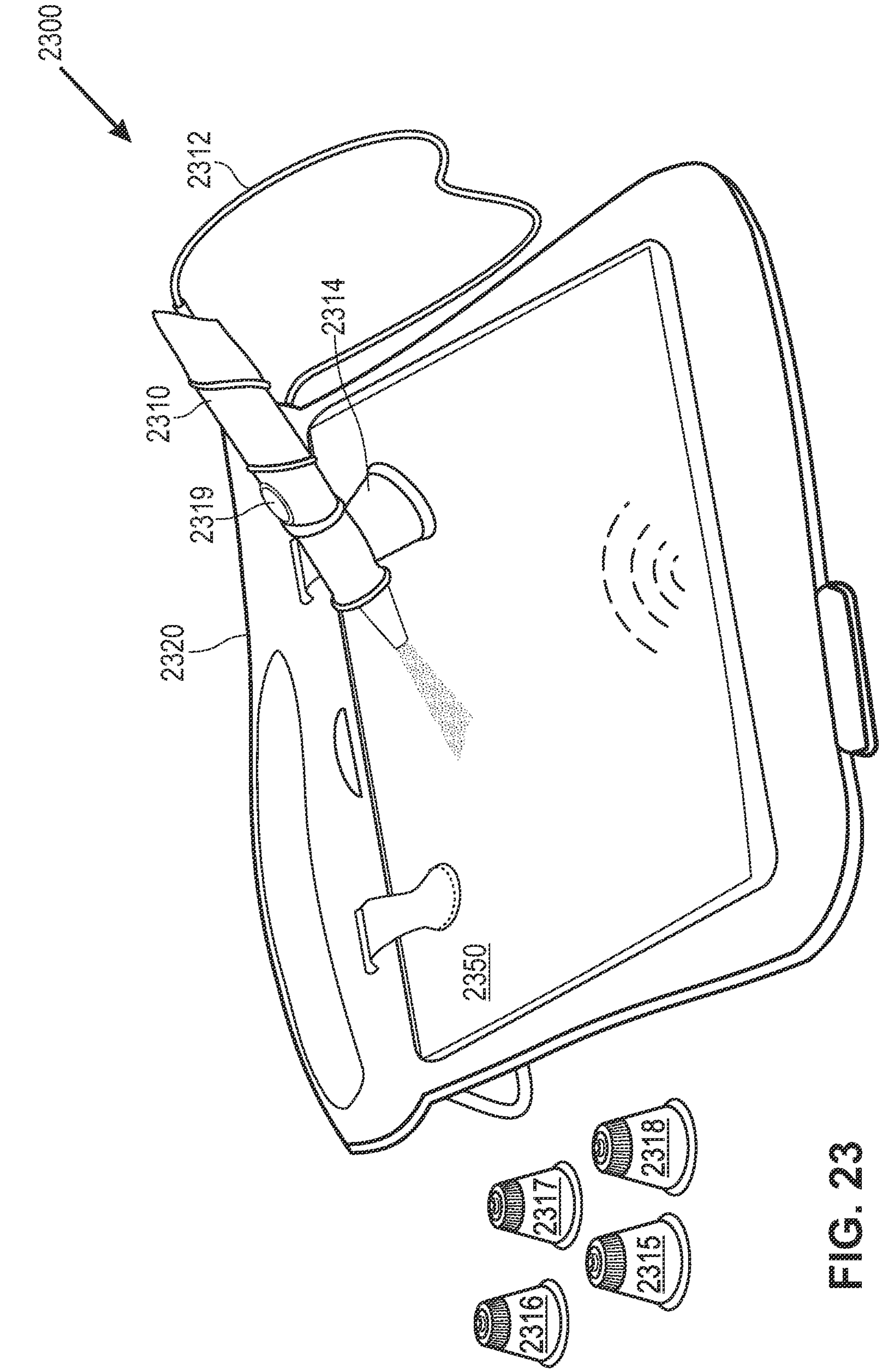
FIG. 23 illustrates an air brush embodiment of the present invention.

FIG. 23 illustrates an air brush system 2300 in accordance with the present invention. As seen in FIG. 23, an air brush 2310 is tethered by a tether 2312 to a work pad 2320. Easy change sealed containers 2314, 2315, 2316, 2317 and 2318 supply a washable paint. A safe radio frequency (rf) signal is emitted by the work pad 2320 and is detected by the air brush 2310 when the brush 2310 is in a compliant zone over paper 2350 on work pad 2320. Upon detection of the signal and activation of a trigger 2319, a portion controlled burst, for example, a two second burst, of paint is applied. One burst is applied per trigger application while the brush 2310 is in the compliant zone where the rf signal is detectable. If the brush 2310 is moved away from the work zone, the rf signal can no longer be detected and the brush is disabled. Such rf based sensing, as well as, other sensing techniques described herein may be collectively referred to as smart sense technology.

Figure 24:
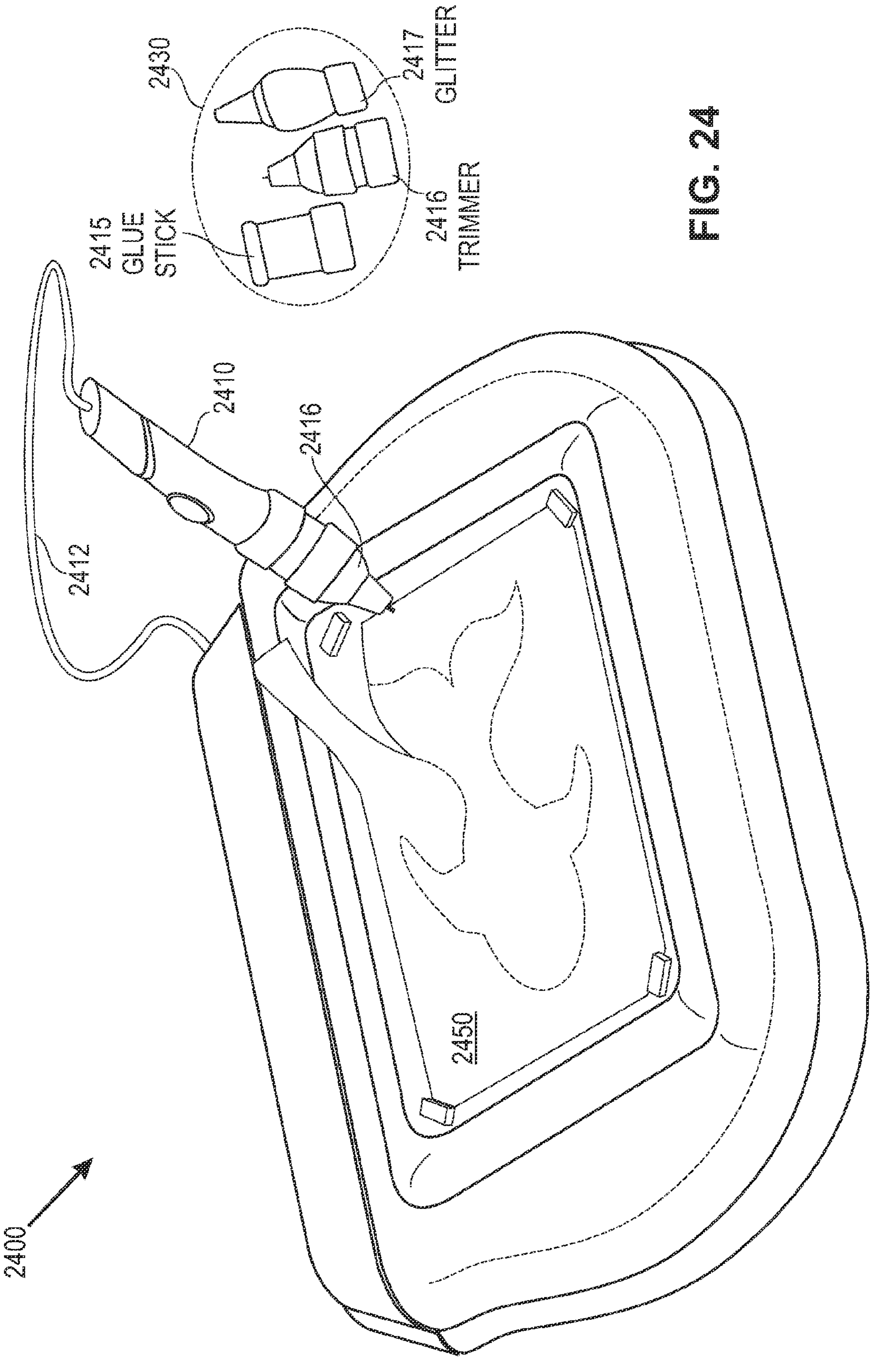
FIG. 24 illustrates a trim and glue station embodiment of the present invention.

FIG. 24 illustrates a trim and glue system 2400 in accordance with the present invention. As seen in FIG. 24, an art supply holder mechanism 2410 is tethered by a tether 2412 to a work pad 2420. The art supply holder mechanism 2410 is able to hold a variety of interlocking art supplies, such as glue stick tip 2415, trimmer tip 2416 and glitter tip 2417 shown in inset 2430. Using smart sense technology, the trimmer tip 2416 is only enabled or turned on when it is within a predetermined distance from paper 2450, such as one inch. Similarly, the glue stick of glue stick tip 2415 only pops out or extends for use when the glue stick tip 2415 is within one inch of the paper 2450. Similarly, glitter tip 2417 only is enabled to apply glitter when the glitter tip 2417 is within one inch of the paper.

Figure 25:
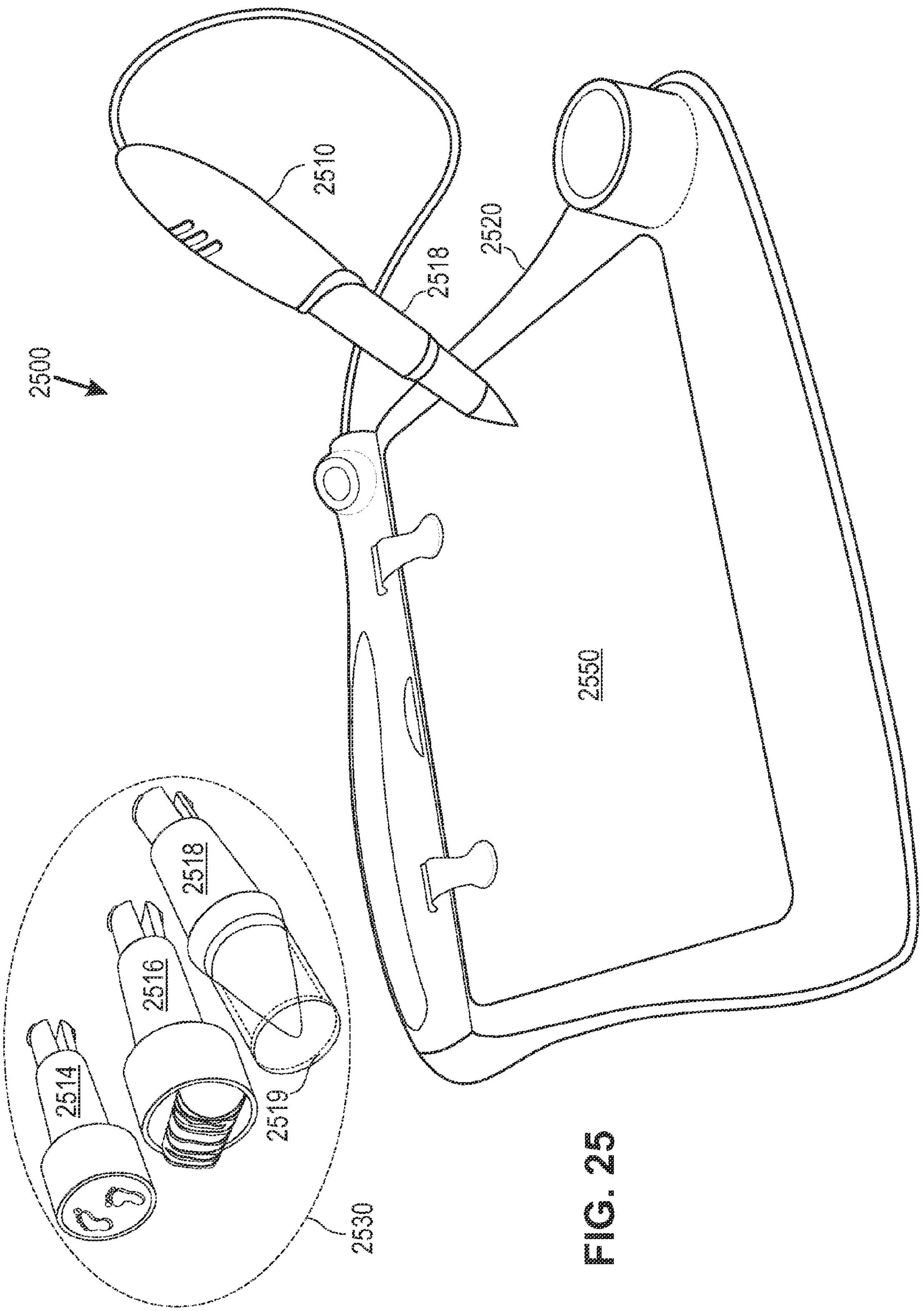
FIG. 25 illustrates a paint, stamp and roll embodiment of the present invention.

FIG. 25 illustrates a paint, stamp and roll system 2500 in accordance with the present invention. As seen in FIG. 25, an art supply holder mechanism 2510 interlockingly holds an art supply tip or head, such as stamp tip 2514, roller tip 2516 or brush tip 2518 seen in insert 2530. As illustrated in FIG. 25, brush tip 2518 is shown being used to paint a picture on paper 2550 on work pad 2520. Brush tip 2518 automatically retracts when not sufficiently near paper 2550 on work pad 2520. Covers, such as cover 2519, further contribute to mess free enjoyment of these exemplary art supplies.

Figure 26:
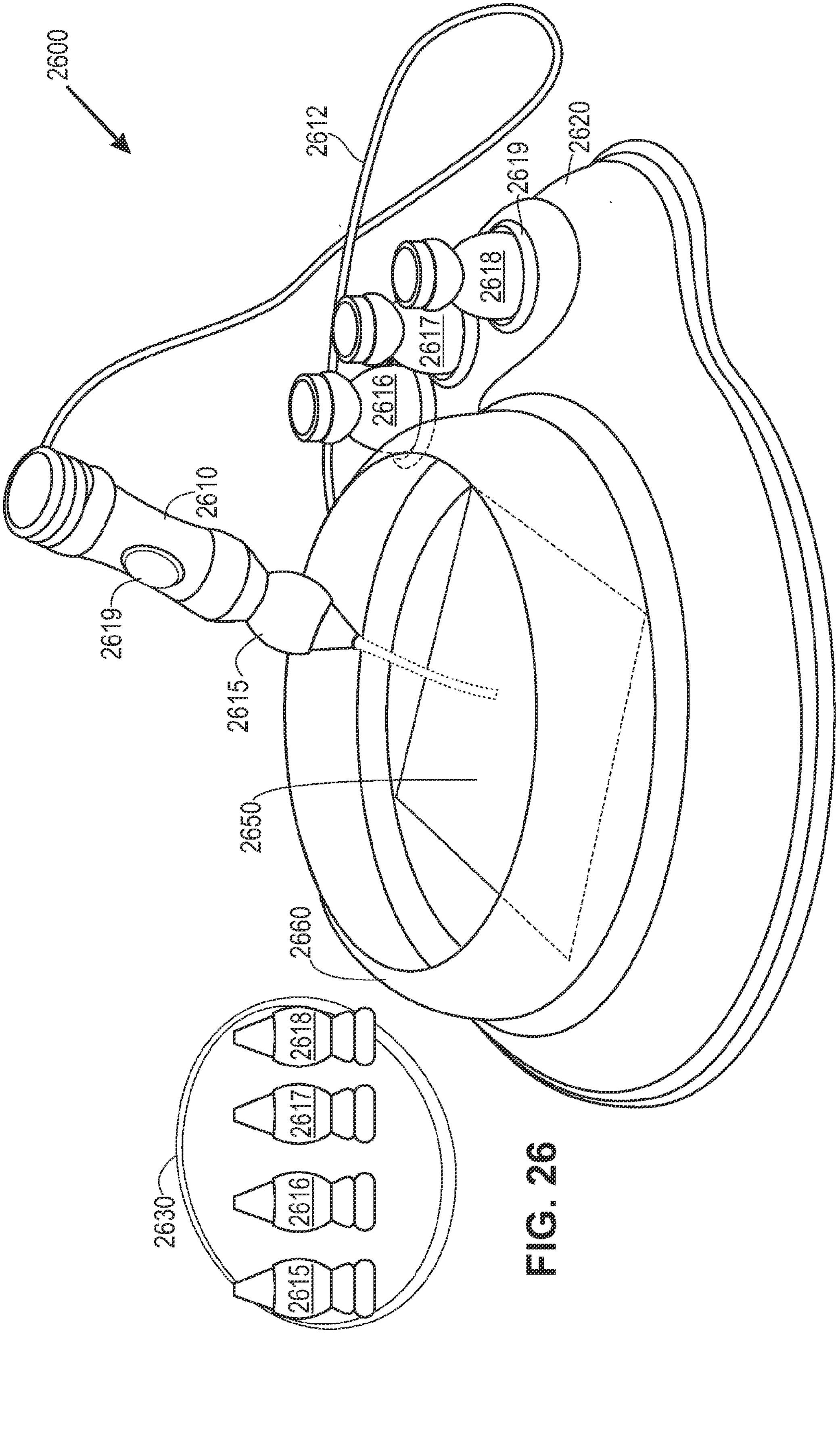
FIG. 26 illustrates a spin art embodiment of the present invention.

FIG. 26 illustrates a spin art system 2600 in accordance with the present invention. As seen in FIG. 26, an art supply holder mechanism 2610 is tethered by a tether 2612 to a spinner mechanism 2620. Dripper supply heads or containers 2615, 2616, 2617 and 2618 are shown in insert 2630. One container 2615 is shown interlocked in holder mechanism 2610 and applying paint to paper 2650 being spun by the spinner 2620. Paint is only applied when trigger 2619 is activated and tip 2615 is sensed using smart sense technology as being safely located within splatter catch guard 2660 of spinner 2620. When not in use, drip containers 2616, 2617 and 2618 may be stored in holders, such as holder 2619 to prevent inadvertent tipping or spilling.

While the present invention has been disclosed in the context of a variety of a presently preferred and illustrative embodiments, the proximity compliance system may be implemented in a wide variety of low cost, highly reliable, and small approaches which are both energy efficient, and utilize standard signal transmission, reception, encoding, decoding, encryption and the like to ensure the implement can only activate or be activated in the compliant zone. Examples of known and effective contact and non contact proximity sensors and sensing systems that can be successfully utilized in conjunction with the teachings of this invention, include inductive, capacitive, RFID, RF proximity sensing, magnetic, electrostatic, acoustic, material sensors, infrared, reflective, laser, sonar, and photoelectric proximity sensors. Utilizing signals not typically found in other devices around the home helps to ensure the system is not accidentally enabled. Further, while many illustrative art supplies are discussed, it will be recognized that the present invention is widely applicable to art supplies and processes that can be categorized in a wide variety of categories, such as those that contain consumable tips and cores such as crayons, chalks, colored and standard pencils, glitter sticks, glue sticks, pencil leads, and the like which may be collectively referred to herein as "consumable tips".

Art supplies containing non-consumable tips such as markers, stamps, rollers, pens, brushes, and the like, may be collectively referred herein as "non-consumable fixed tips".

A third broad category of art supplies feeds ink, such as pump, spray, squeeze, drip or gravity feed systems including paint airbrushes, glues, stamps, powder sprayers, and certain paint rollers, for example, may be collectively referred to herein as called "material feed systems".

A fourth category of art supplies are movement-based tips such as piston tip wand based and vibration type cutters, etchers, embossing tools which may be collectively referred to here as "moving tips".

Further specialized features, such as tips and materials that require sealed covers to prevent drying out, tips that require sharpening, or tips that require washing such as a brush, may be viewed as common features for grouping art supplies. The specific enabling and disabling means and mechanism will vary slightly based on the nature of the art supply or art process as outlined above. It is also recognized that this safety compliance system can be utilized in other applications in addition to art supplies.

I claim:

1. An art supply system comprising:

a selectively enabled art supply for insertion in a holder mechanism:

the holder mechanism holding the selectively enabled art supply upon insertion, and detecting a compliant usage area; and a control system which enables use of the art supply in the compliant usage area and disables use of the art supply outside the compliant usage area by activating the holder mechanism to enable use of the art supply only upon the holder mechanism detecting the compliant usage area.

2. The art supply system of claim 1 wherein the selectively enabled art supply is enabled by automatically extending a marking tip.

3. The art supply system of claim 1 wherein the selectively enabled art supply is enabled by activating an actuator mechanism which is actuated by a user to utilize the selectively enabled art supply.

4. The art supply system of claim 1 wherein the selectively enabled art supply is enabled by uncovering part of the selectively enabled art supply.

5. The art supply system of claim 1 wherein the selectively enabled art supply is enabled by controlling release of a flow of material.

6. The art supply system of claim 1 wherein the selectively enabled art supply is enabled by activating a pump.

7. The art supply system of claim 1 wherein the selectively enabled art supply is enabled by activating a motor.

8. The art supply system of claim 1 further comprising a compliant activity surface which generates a signal detectable by the holder mechanism.

9. The art supply system of claim 1 further comprising a compliant activity surface which communicates proximity information with the holder control system in order to determine the art supply is in the compliant usage area.

10. The art supply system of claim 1 wherein the compliant usage area is within a predetermined distance of an art supply supporting surface.

11. The art supply system of claim 1 wherein the holder mechanism and the selectively enabled art supply mechanically interlock inside the compliant usage area.

12. The art supply system of claim 2 further comprising a plurality of interchangeable detachable selectively enabled art supply components which mechanically interlock with the holder mechanism outside the compliant usage area.

13. The art supply system of claim 1 wherein the holder mechanism and the selectively enabled art supply form an integral non-separable unit.

14. A method of assuring usage of an art supply in a compliant manner comprising:

attaching a selectively enabled art supply in a disabled condition to a holder mechanism;

detecting entry of the holder mechanism to a compliant usage area by the holder mechanism;

interlocking the selectively enabled art supply and the holder mechanism upon said detecting entry; and enabling the selectively enabled art supply by a control system to activate the holder mechanism to enable use of the art supply in the compliant usage area.

15. The method of claim 14 further comprising:

detecting movement of the holder mechanism out of the compliant usage area; and disabling the selectively enabled art supply upon detecting movement of the holder mechanism out of the compliant usage area.

16. The method of claim 15 wherein enabling the selectively enabled art supply comprises extending a consumable tip.

17. The method of claim 15 wherein enabling the selectively enabled art supply comprises uncovering part of the selectively enabled art supply.

18. The method of claim 15 wherein enabling the selectively enabled art supply comprises controlling release of a flow of material.

19. The method of claim 15 wherein enabling the selectively enabled art supply comprises activating a pump.

20. The method of claim 15 further comprising:

generating a signal by a compliant activity surface which is detectable by the holder mechanism to control enabling the selectively enabled art supply by the holder mechanism.

* * * * *